(12) United States Patent
Djuric et al.

(10) Patent No.: US 11,635,764 B2
(45) Date of Patent: Apr. 25, 2023

(54) MOTION PREDICTION FOR AUTONOMOUS DEVICES

(71) Applicant: UATC, LLC, San Francisco, CA (US)

(72) Inventors: Nemanja Djuric, Pittsburgh, PA (US); Henggang Cui, Allison Park, PA (US); Thi Duong Nguyen, Pittsburgh, PA (US); Fang-Chieh Chou, San Francisco, CA (US); Tsung-Han Lin, San Francisco, CA (US); Jeff Schneider, Pittsburgh, PA (US); David McAllister Bradley, Pittsburgh, PA (US)

(73) Assignee: UATC, LLC., Mountain View, CA (US)

( * ) Notice: Subject to any disclaimer, the term of this patent is extended or adjusted under 35 U.S.C. 154(b) by 436 days.

(21) Appl. No.: 16/506,522

(22) Filed: Jul. 9, 2019

(65) Prior Publication Data

US 2020/0272160 A1 Aug. 27, 2020

Related U.S. Application Data

(60) Provisional application No. 62/809,470, filed on Feb. 22, 2019.

(51) Int. Cl.
*G05D 1/02* (2020.01)
*G06T 7/73* (2017.01)
(Continued)

(52) U.S. Cl.
CPC .......... *G05D 1/0223* (2013.01); *G01S 7/4808* (2013.01); *G01S 17/88* (2013.01);
(Continued)

(58) Field of Classification Search
CPC ..... B60W 2050/0088; B60W 2555/60; B60W 30/0956; B60W 60/00276; G01S 7/4808;
(Continued)

(56) References Cited

U.S. PATENT DOCUMENTS 10,133,275 B1 * 11/2018 Kobilarov ............ G05D 1/0272
2015/0002670 A1 * 1/2015 Bajpai ...................... B60R 1/00
348/148
(Continued)

FOREIGN PATENT DOCUMENTS

WO WO-2005062275 A1 * 7/2005 ............. G08G 1/054

OTHER PUBLICATIONS

Irene Cara and Erwin de Gelder, Classification for Safety-Critical Car-Cyclist Scenarios using Machine Learning, 2015, 2015 IEEE 18th International Conference on Intelligent Transportation Systems (Year: 2015).*
(Continued)

*Primary Examiner* — Geepy Pe
*Assistant Examiner* — Sean Patrick Reidy
(74) *Attorney, Agent, or Firm* — Dority & Manning, P.A

(57) ABSTRACT

Systems, methods, tangible non-transitory computer-readable media, and devices associated with the motion prediction and operation of a device including a vehicle are provided. For example, a vehicle computing system can access state data including information associated with locations and characteristics of objects over a plurality of time intervals. Trajectories of the objects at subsequent time intervals following the plurality of time intervals can be determined based on the state data and a machine-learned tracking and kinematics model. The trajectories of the objects can include predicted locations of the objects at subsequent time intervals that follow the plurality of time intervals. Further, the predicted locations of the objects can be based on physical constraints of the objects. Furthermore, indications, which can include visual indications, can be generated based on the predicted locations of the objects at the subsequent time intervals.

20 Claims, 9 Drawing Sheets

(51) Int. Cl.

| | |
|---|---|
| *G01S 7/48* | (2006.01) |
| *G06N 3/02* | (2006.01) |
| *H04W 4/46* | (2018.01) |
| *G01S 17/88* | (2006.01) |
| *G06V 20/56* | (2022.01) |

(52) U.S. Cl.
CPC ............. *G05D 1/0231* (2013.01); *G06N 3/02* (2013.01); *G06T 7/73* (2017.01); *G06V 20/56* (2022.01); *H04W 4/46* (2018.02); *G06T 2207/30252* (2013.01)

(58) Field of Classification Search
CPC ...... G01S 17/88; G01S 17/931; G01S 13/931; G01S 13/723; G05D 1/0223; G05D 1/0231; G06K 9/00791; G06K 9/6262; G06N 3/02; G06N 5/003; G06N 3/0445; G06N 20/10; G06N 3/08; G06T 7/73; G06T 2207/30252; G06T 7/20; G06T 2207/30241; H04W 4/46; H04W 4/40
USPC .......................................................... 701/25
See application file for complete search history.

(56) References Cited

U.S. PATENT DOCUMENTS

| | | | |
|---|---|---|---|
| 2017/0120804 A1* | 5/2017 | Kentley | ................ B60W 30/08 |
| 2018/0302614 A1* | 10/2018 | Toksvig | .................. G06T 19/00 |
| 2019/0155290 A1* | 5/2019 | Luo | ...................... G05D 1/0214 |
| 2019/0355132 A1* | 11/2019 | Kushleyev | ............. G06V 20/56 |
| 2019/0389459 A1* | 12/2019 | Berntorp | ......... B60W 30/18163 |
| 2020/0159232 A1* | 5/2020 | Refaat | ...................... G06N 5/04 |
| 2021/0341886 A1* | 11/2021 | Liu | ........................ G06N 5/022 |

OTHER PUBLICATIONS

Chou et al., "Predicting Motion of Vulnerable Road Users using High-Definition Maps and Efficient ConvNets", Conference on Neural Information Processing Systems Workshop, Dec. 3-8, 2018, Montreal, Canada, 9 pages.

Cui et al., "Multimodal Trajectory Predictions for Autonomous Driving using Deep Convolutional Networks", arXiv:1809v2, Mar. 1, 2019, 7 pages.

Djuric et al., "Short-Term Motion Prediction of Traffic Actors for Autonomous Driving using Deep Convolutional Networks", arXiv:1808v2, 7 pages.

* cited by examiner

MOTION PREDICTION FOR AUTONOMOUS DEVICES

RELATED APPLICATION

The present application is based on and claims benefit of U.S. Provisional Patent Application No. 62/809,470 having a filing date of Feb. 22, 2019, which is incorporated by reference herein.

FIELD

The present disclosure relates generally to operation of a motion prediction system that uses a machine-learned model to predict object states.

BACKGROUND

Vehicles, including autonomous vehicles, can receive data that is used to determine the state of objects in an environment through which the vehicle travels. This data can be used to perform various operations related to the state of those objects. As the state of objects in the environment is dynamic, and the set of objects in the environment can change over time, effective operation of a vehicle may depend on the determination of the state of this changing environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of motion prediction and/or operation of a device including a vehicle. The computer-implemented method can include accessing, by a computing system including one or more computing devices, state data including information associated with one or more respective locations and characteristics of one or more objects over a plurality of time intervals. Further, the method can include determining, by the computing system, one or more trajectories of the one or more objects based at least in part on the state data and a machine-learned tracking and kinematics model. The one or more trajectories can include one or more predicted locations of the one or more objects at one or more subsequent time intervals. The one or more predicted locations of the one or more objects can be based at least in part on one or more physical constraints of the one or more objects. Furthermore, the method can include generating, by the computing system, one or more outputs including one or more predicted object states based at least in part on the one or more predicted locations of the one or more objects at the one or more subsequent time intervals.

Another example aspect of the present disclosure is directed to one or more tangible non-transitory computer-readable media storing computer-readable instructions that when executed by one or more processors cause the one or more processors to perform operations. The operations can include accessing state data including information associated with one or more respective locations and characteristics of one or more objects over a plurality of time intervals. The operations can also include determining one or more trajectories of the one or more objects based at least in part on the state data and a machine-learned tracking and kinematics model. The one or more trajectories can include one or more predicted locations of the one or more objects at one or more subsequent time intervals. The one or more predicted locations of the one or more objects can be based at least in part on one or more physical constraints of the one or more objects. Furthermore, the operations can include generating one or more outputs including one or more predicted object states based at least in part on the one or more predicted locations of the one or more objects at one or more subsequent time intervals.

Another example aspect of the present disclosure is directed to a computing device including: one or more processors; a memory including one or more computer-readable media, the memory storing computer-readable instructions that when executed by the one or more processors cause the one or more processors to perform operations. The operations can include accessing state data including information associated with one or more respective locations and characteristics of one or more objects over a plurality of time intervals. The operations can also include determining one or more trajectories of the one or more objects based at least in part on the state data and a machine-learned tracking and kinematics model. The one or more trajectories can include one or more predicted locations of the one or more objects at one or more subsequent time intervals. The one or more predicted locations of the one or more objects can be based at least in part on one or more physical constraints of the one or more objects. Furthermore, the operations can include generating one or more outputs including one or more predicted object states based at least in part on the one or more predicted locations of the one or more objects at the one or more subsequent time intervals.

Other example aspects of the present disclosure are directed to other systems, methods, vehicles, apparatuses, tangible non-transitory computer-readable media, and devices for motion prediction and/or operation of a device including a vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
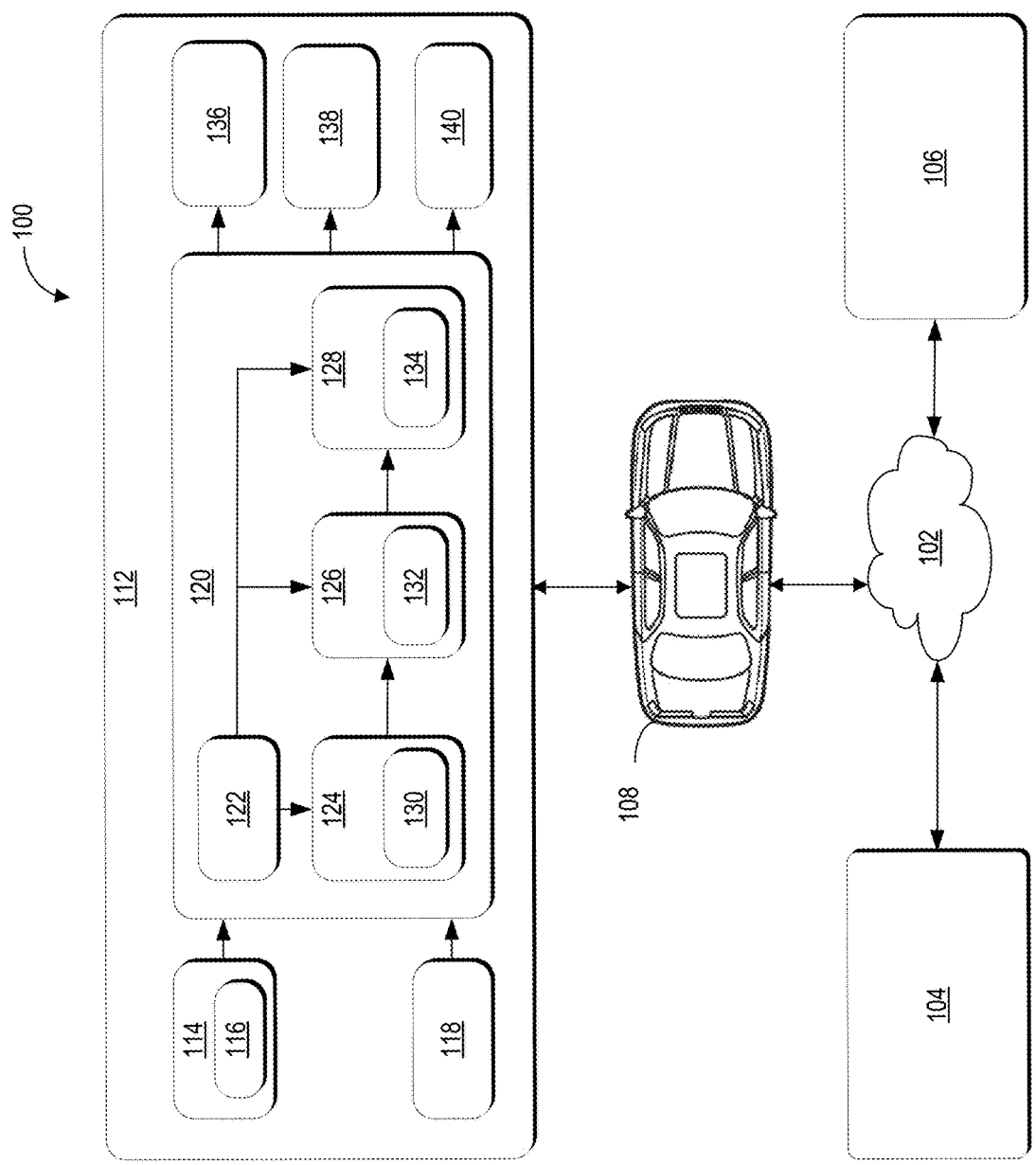
FIG. 1 depicts a diagram of an example system according to example embodiments of the present disclosure.

Example aspects of the present disclosure are directed to determining motion paths for one or more objects in an environment proximate to a vehicle. For example, the present disclosure describes the prediction of motion and the determination of trajectories for objects including vehicles, pedestrians, and/or cyclists in the environment surrounding an autonomous vehicle, a semi-autonomous vehicle, and/or a manually operated vehicle. Further, aspects of the present disclosure are also directed to the use of machine-learned models that can be trained to predict the motion of objects including the trajectories and locations of objects at some time in the future.

More particularly, aspects of the present disclosure include accessing state data that includes information associated with respective locations and/or characteristics of objects over a plurality of time intervals. Examples of the characteristics of objects include the velocity and/or physical dimensions of an object. By way of further example, the state data can provide information associated with the speed and direction of vehicles and pedestrians in an environment detected by sensors of an autonomous vehicle. Based at least in part on the state data and a machine-learned tracking and kinematics model, trajectories of the objects can be determined for one or more subsequent time intervals following the plurality of time intervals. For example, the state data can be provided as an input to the machine-learned tracking and kinematics model, which has been trained to receive the input and generate an output including one or more trajectories of the one or more objects at one or more subsequent time intervals following the plurality of time intervals. Further, the trajectories of the objects can include predicted locations of the objects at the subsequent time intervals. The predicted locations of the objects can be based on physical constraints of the objects. Examples of the physical constraints of objects can include a maximum velocity and/or turning radius of an object. Use of the physical constraints can result in a more realistic determination of the trajectory of the objects since the trajectories can be constrained by the physical limitations of the objects and/or the physical environment in which the objects are present. A computing system can then generate outputs based at least in part on the predicted locations of the objects at the subsequent time intervals. The outputs can then be used for a variety of purposes including motion planning for an autonomous vehicle or other devices that can use the trajectories and/or predicted locations of objects.

By way of example, a computing system (e.g., a vehicle computing system) of a vehicle can access state data that indicates the respective locations and characteristics of objects (e.g., the location and velocity of a school bus) in the environment around the vehicle. The sensor data can be based on sensor outputs from one or more sensors of the vehicle (e.g., LiDAR, cameras, radar, and/or sonar) that the vehicle uses to detect the state of the environment surrounding the vehicle. The computing system can also access (e.g., access local data stored on the vehicle or remote data stored at a remote source) various machine-learned models (e.g., a machine-learned tracking and kinematics model) that have been configured and/or trained to determine the trajectory of objects detected by the sensors of the vehicle.

The computing system can use any combination of the state data and/or the machine learned models to determine trajectories of the objects (e.g., the trajectories of other vehicles and pedestrians within range of a vehicle's sensors). Furthermore, the trajectories can include predicted locations of the objects (e.g., geographic locations of other vehicles around the vehicle associated with the computing system). The predicted locations of the objects can then be used to perform various operations including determining a more optimal travel path for the vehicle as it travels (e.g., motion planning for a vehicle), controlling vehicle systems (e.g., steering the vehicle around the predicted locations of the objects), and generating indications of the predicted locations of the objects (e.g., generating visual indications on a display device of the vehicle).

As such, the disclosed technology can use the predicted locations of objects around a device (e.g., a non-autonomous device and/or an autonomous device including a vehicle and/or robotic device) to more effectively determine operate a vehicle. Additionally, the disclosed technology allows for more accurate prediction of the movement of objects through use of a machine-learned model that uses the physical characteristics of objects. By using the physical characteristics of objects to constrain the potential motion paths of objects, a more true to life determination of object motion can be achieved.

Furthermore, by enabling more effective prediction of object locations, the disclosed technology allows for various improvements including a number of safety improvements (e.g., improved object avoidance), more efficient motion planning, less wear and tear on vehicle components due to fewer course corrections, and more efficient use of computational resources resulting from constraining predicted locations of objects based on physical constraints of the objects.

A vehicle according to the disclosed technology can include one or more systems (e.g., computing systems) including a vehicle computing system (e.g., one or more computing devices with one or more processors and a memory storage device that can control a variety of vehicle systems, vehicle components, and/or robotic systems). The vehicle computing system can process, generate, access (e.g., send and/or receive) one or more signals and/or data, including signals and/or data exchanged with various vehicle systems, vehicle components, other vehicles, or remote computing systems. Furthermore, the vehicle computing system described herein can access data and/or information by obtaining and/or retrieving the data and/or information (e.g., actively accessing data) from another computing system and/or computing device; and/or receiving, being sent, and/or being provided with data and/or information (e.g., passively accessing data) from another computing system and/or computing device. Further, any of the computing systems and/or computing devices described herein can access data and/or information by sending and/or receiving one or more signals encoded with data and/or information.

For example, the vehicle computing system can send and/or receive one or more signals (e.g., electronic signals) and/or data with one or more vehicle systems including one or more sensor systems (e.g., systems that generate one or more outputs based on detection of changes in the state of the physical environment external to the vehicle) including LiDAR devices, cameras, microphones, radar devices, thermal sensors, and/or sonar devices; communication systems (e.g., wired and/or wireless communication systems that can exchange signals and/or data with other devices); perception systems including one or more systems used to determine the state of the environment surrounding a vehicle; motion planning systems including one or more systems used to determine a travel path for a vehicle; navigation systems (e.g., devices that can receive signals from GPS, GLONASS, or other systems used to determine a vehicle's geographical location); notification systems (e.g., devices used to provide notifications to other vehicles and/or pedestrians, including display devices, status indicator lights, and/or audio output devices); braking systems used to slow down the vehicle (e.g., brakes of the vehicle including mechanical and/or electric brakes); propulsion systems used to provide power for the vehicle to move from one location to another (e.g., motors and/or engines including electric engines and/or internal combustion engines); and/or steering systems used to change the path, course, and/or direction of travel of the vehicle.

Furthermore, the vehicle computing system can access one or more machine-learned models that have been at least partly generated and/or trained using training data including a plurality of training objects (e.g., various vehicles including automobiles, motorcycles, and/or buses) that have a plurality of features (e.g., physical dimensions and/or shapes) and which are associated with a respective plurality of classified object labels. In some embodiments, the plurality of features of the plurality of training objects can be extracted from training data that includes a plurality of images associated with one or more sensor outputs from one or more sensors (e.g., one or more LiDAR devices) that detect the plurality of training objects.

When the one or more machine-learned models have been trained, the one or more machine-learned models can associate some of the plurality of features with one or more of the plurality of classified object labels that are used to classify and/or categorize objects including objects that are not included in the plurality of training objects. In some embodiments, as part of the training process, differences in correct classification output between a machine-learned model (that outputs the one or more classified object labels) and a set of classified object labels associated with a plurality of training objects that have previously been correctly identified (e.g., ground truth labels), can be processed using an error loss function that can determine a set of probability distributions based on repeated classification of the same plurality of training objects. As such, the accuracy (e.g., the proportion of correctly identifies objects) of the machine-learned model can be improved over time.

The vehicle computing system can access the machine-learned model in various ways including accessing data and/or information associated with one or more machine-learned models stored on a remote computing device (e.g., a computing device that is accessed via a wired and/or wireless network connection); and/or accessing one or more machine-learned models that are stored locally (e.g., in one or more storage devices of the vehicle).

Furthermore, the plurality of features can be associated with one or more values that can be analyzed individually and/or in various combinations. The analysis of the one or more values associated with the plurality of classified features can include determining a mean, mode, median, variance, standard deviation, maximum, minimum, and/or frequency of the one or more values associated with the plurality of features. Further, analysis of the one or more values associated with the plurality of features can include comparisons of the differences or similarities between the one or more values. For example, the one or more objects associated with a particular type of vehicle (e.g., a bus) can be associated with a range of physical dimensions that are different from the range of physical dimensions associated with another type of vehicle (e.g., a race car).

In some embodiments, the plurality of features classified by the one or more machine-learned models can include a range of physical dimensions associated with the plurality of training objects (e.g., a training object's length, width, and/or height), a range of colors associated with the plurality of training objects, and/or a range of shapes associated with the plurality of training objects (e.g., a physical profile corresponding to a certain type of vehicle). Further, the plurality of features classified by the one or more machine-learned models can be based in part on one or more sensor outputs from one or more sensors that have captured the plurality of training objects (e.g., the actual objects used to train the machine-learned model) from various angles and/or distances in different environments (e.g., urban areas, suburban areas, rural areas, heavy traffic, and/or light traffic) and/or environmental conditions (e.g., bright daylight, rainy days, darkness, snow covered roads, inside parking structures, in tunnels, and/or under streetlights). The one or more classified object labels can then be used to classify and/or categorize the one or more training objects, including one or more vehicles (e.g., automobiles, buses, motorcycles, bicycles, scooters, and/or mopeds), buildings, roads, sidewalks, bridges, overpasses, waterways, pedestrians, trees, foliage, and/or natural geographic formations.

The vehicle computing system can access state data including information associated with one or more locations and/or one or more characteristics of one or more objects over a plurality of time intervals. In some embodiments, the state data can include information associated with the one or more respective locations and characteristics of one or more objects. For example, the vehicle computing system can receive one or more sensor outputs from one or more sensors of a vehicle. Further, the vehicle computing system can generate the state data based at least in part on the one or more sensor outputs and can access the state data via one or more communications channels of the vehicle computing system. The state data can include information associated with any combination of the one or more objects including each object individually, some of the objects, and/or all of the objects.

In some embodiments, the one or more locations can include: one or more geographical locations including latitude, longitude, and/or altitude; and/or a location relative to some point of reference including a distance and set of angles relative to the point of reference.

In some embodiments, the state data can include information associated with the position and/or placement of the one or more objects including an orientation, bearings, and/or direction. For example, the position of the one or more objects can be used to determine what direction an object or some portion of an object is facing, whether an object is upright, and/or whether an object is on its side.

In some embodiments, the one or more characteristics can include at least one of a plurality of physical dimensions, one or more shapes, acceleration, and/or a velocity, a heading, or a heading rate of change. For example, the one or more characteristics can include the velocity and heading of a vehicle detected by one or more sensors associated with the vehicle computing system.

In some embodiments, the plurality of physical dimensions can include a distance between a front wheel axle and a rear wheel axle of an object of the one or more objects. For example, the plurality of physical dimensions can include the distance in meters between the front wheel axle of a vehicle object and the rear wheel axle of a vehicle object.

In some embodiments, the one or more objects can include one or more vehicles with a fixed rear wheel axle and a moveable front wheel axle. For example, the one or more objects can include vehicles including automobiles, motorcycles, mopeds, and/or bicycles with a moveable front wheel axle that is used to determine a direction of travel for the vehicles (e.g., turning the front wheel axle to the right to change a vehicle's direction of travel to the right.

In some embodiments, the state data can be based at least in part on one or more outputs from one or more sensors including at least one of one or more light detection and ranging devices (LiDAR), one or more radar devices, one or more sonar devices, one or more thermal sensors, and/or one or more image sensors.

In some embodiments, the one or more sensors can be positioned to provide a bird's eye view of the one or more objects. For example, the one or more sensors can be positioned on the roof of a vehicle associated with the vehicle computing system. Sensor data can be transformed into one or more view perspectives, (e.g., a bird's eye view) in various ways including a transformation algorithm and/or projection techniques. A bird's eye view of the one or more objects can allow for more effective determination of the physical dimensions of an object (e.g., the length and width of vehicle may be more readily discerned from a bird's eye view in comparison to a front view or side view of the vehicle).

In other embodiments, the one or more sensors can be positioned on any portion of the exterior and/or interior of a device and/or vehicle associated with the one or more sensors. Further, the one or more sensors can be mounted on a device that can then be positioned on any portion of the exterior and/or interior of the device and/or vehicle associated with the one or more sensors. For example, the one or more sensors can be positioned on the hood, trunk, doors, bumper, and/or undercarriage of a vehicle.

In some embodiments, the state data can include one or more rasterized RGB images of an environment detected by the one or more sensors. For example, the vehicle computing system can generate rasterized RGB images of the environment based on the one or more sensor outputs of the one or more sensors. The rasterized RGB images may allow for improved determination of features (by the machine-learned tracking and kinematics model) of the one or more objects including physical dimensions and/or shapes of the one or more objects.

In some embodiments, the state data can include one or more images that include multiple channels, in which each channel is a binary mask that can be used to identify one or more portions of each image. For example, an image of a map can include a binary mask that is encoded to identify portions of the image of the map that are crosswalks. Further, another image of a map can include a binary mask that is encoded to identify portions of the image of the map that are sidewalks.

The vehicle computing system can determine, based at least in part on the state data and a machine-learned tracking and kinematics model, one or more trajectories of the one or more objects at one or more subsequent time intervals following the plurality of time intervals. For example, the state data (e.g., state data in the form of one or more images of an environment including the one or more objects over the plurality of time intervals) can be provided as an input to the machine-learned tracking and kinematics model, which has been trained to receive the input and generate an output including one or more trajectories of the one or more objects at one or more subsequent time intervals following the plurality of time intervals. By way of further example, the machine-learned tracking and kinematics model can receive thirty rasterized RGB images of an environment captured at zero point one (0.1) second intervals totaling three seconds. The machine-learned tracking and kinematics model can then determine one or more trajectories for ten subsequent zero point one (0.1) second intervals totaling one second.

The one or more trajectories of the one or more objects at the one or more subsequent time intervals can include one or more predicted locations of the one or more objects at the one or more subsequent time intervals. The one or more predicted locations (e.g., geographic locations and/or locations relative to a point of reference which can include the vehicle computing system or a sensor associated with the vehicle computing system) of the one or more objects can be based at least in part on one or more physical constraints of the one or more objects. Furthermore, the machine-learned tracking and kinematics model can use the one or more physical constraints of the one or more objects to determine the occurrence of events such as wheel slippage when a wheeled object loses traction with a road surface (e.g., traction loss due to a slipper road surface), thereby resulting in a more realistic and accurate prediction of the future location of an object in motion.

In some embodiments, the machine-learned tracking and kinematics model can include at least one of a convolutional neural network, a recurrent neural network, a recursive neural network, a decision tree, logistic regression model, and/or a support vector machine.

In some embodiments, the machine-learned tracking and kinematics model can include one or more machine-learned tracking models that are configured and/or trained to track one or more objects and/or one or more kinematics models that are configured and/or trained to determine the motion of one or more objects based at least in part on physical constraints of the respective one or more objects. Further, the machine-learned tracking and kinematics model can include one or more layers (e.g., convolutional layers) that are used to track one or more objects and/or one or more layers that are used to determine the kinematics of one or more objects.

In some embodiments, the one or more machine-learned tracking models can include any of the features of the one or more machine-learned kinematics models and/or can perform any of the operations and/or functions of the one or more machine-learned kinematics models. Further, the one or more machine-learned kinematics models can include any of the features of the one or more machine-learned tracking models and/or can perform any of the operations and/or functions of the one or more machine-learned tracking models.

Further, the one or more machine-learned tracking models and/or the one or more machine-learned kinematics models can be based at least in part on one or more neural networks that include one or more layers (e.g., layers including input nodes, output nodes, and/or intermediate nodes between the input nodes and output nodes). Further, the one or more machine-learned tracking models can include any of the layers of the one or more machine-learned kinematics models. The one or more machine-learned kinematics models can also include any of the layers of the one or more machine-learned tracking models.

The vehicle computing system can generate one or more outputs including one or more predicted object states based at least in part on the one or more predicted locations of the one or more objects at the one or more subsequent time intervals. For example, the vehicle computing system can generate one or more outputs including one or more predicted object states that indicate the predicted state (e.g., the velocity, acceleration, and/or heading) of an object at a subsequent time interval. The predicted state of the object can be used to perform one or more operations associated with motion planning for a vehicle (e.g., determining a travel path for a vehicle that does not intersect any of the one or more predicted locations of the one or more objects).

By way of further example, the vehicle computing system can generate one or more outputs including one or more signals that can be used to perform one or more operations associated with implementing a motion plan for a vehicle. The one or more signals can be used to activate and/or control one or more vehicle systems including a vehicle motor system, a vehicle steering system, and/or a vehicle braking system. By way of further example, the vehicle computing system can generate one or more outputs including one or more visual indications representative of an environment including the one or more objects at their respective one or more predicted locations. The one or more visual indications can be displayed on a display device of a vehicle associated with the vehicle computing system and can be used for various purposes including providing passengers with a visual representation of the predicted state of the environment around a vehicle.

In some embodiments, the vehicle computing system can determine one or more control inputs for each of the one or more objects based at least in part on the one or more trajectories of each of the one or more objects. The one or more control inputs can include an input to a control device of an object (e.g., a control device of a vehicle). For example, the one or more control inputs can include a control input to a steering wheel of a vehicle that is used to determine the direction of travel of a vehicle. In some examples, a control input can include a longitudinal acceleration and/or a steering angle.

Further, the one or more control inputs can include a left turn of the control device or a right turn of the control device. For example, based on a control input to turn an object (e.g., a vehicle) to the right, the vehicle computing system can generate one or more control signals that are transmitted to a motor that operates a front wheel axle of a vehicle and can turn the front wheel axle of the vehicle to the right.

The vehicle computing system can determine one or more control uncertainties respectively associated with the one or more control inputs of each of the one or more objects at the one or more subsequent time intervals. Each of the one or more control uncertainties can be associated with a magnitude or degree of uncertainty for the one or more control inputs for each of the one or more objects at the one or more subsequent time intervals. For example, the one or more control uncertainties for the degree of uncertainty of a control input that is a steering wheel can be expressed as a number of degrees to the left or right of a determined control input (e.g., plus or minus two degrees from the position of the steering wheel determined by the vehicle computing system).

The vehicle computing system can determine one or more uncertainties respectively associated with each of the one or more predicted locations of the one or more objects. Each of the one or more uncertainties can include a respective range distance around each of the one or more predicted locations. For example, the vehicle computing system can determine that an uncertainty of a predicted location is eight centimeters around the predicted location that was determined (e.g., an eight centimeter radius around the predicted location).

The vehicle computing system can determine the one or more physical constraints of each of the one or more objects based at least in part on the one or more characteristics of each of the one or more objects. For example, the one or more characteristics of an object (e.g., a school bus) include physical dimensions (e.g., a length of indicating that the object is eighteen meters long, two and a half meters wide, and three meters tall) and a velocity of sixty kilometers per hour that correspond to one or more physical constraints of the object including a maximum turning angle (e.g., the maximum turning angle for the object before the object is likely to roll over on its side) of ten degrees from the current path of travel of the object. In some embodiments, the vehicle computing system can determine the one or more physical constraints of each of the one or more objects based at least in part on the one or more respective locations and characteristics of each of the one or more objects. Furthermore, in some embodiments, the machine-learned tracking and kinematics model can learn to determine some physical dimensions of an object based on other physical dimensions of an object. For example, the machine-learned tracking and kinematics model can be configured and/or trained to determine the distance between the front axle and the rear axle of a two-axle vehicle based on other characteristics of the vehicle including the overall physical dimensions and/or motion characteristics of the vehicle.

The one or more physical constraints can include at least one of a turning radius, a minimum stopping distance, a maximum acceleration, a maximum velocity, a maximum turn angle for each velocity of a plurality of velocities, or a maximum velocity for each angle of a plurality of turn angles. For example, the turning radius for a large object (e.g., a school bus) can be thirteen meters and the turning radius for a smaller object (e.g., a sports car) can be ten meters. As such, the smaller object can execute sharper turns than the larger object when travelling at the same velocity.

In some embodiments, the vehicle computing system can determine, based at least in part on the machine-learned tracking and kinematics model and the one or more trajectories of the one or more objects at the one or more subsequent time intervals, one or more predicted control inputs of the one or more objects at the one or more subsequent time intervals. For example, the vehicle computing system can use a trajectory over a time interval to determine the angle of a predicted control input that would result in the associated trajectory.

Further, the one or more predicted control inputs of the one or more objects can include one or more inputs to a control device of an object (e.g., a control device of a vehicle). For example, the one or more predicted control inputs can include a prediction that a vehicle's steering wheel will turn four degrees to the left at a subsequent time interval one second in the future.

In some embodiments, the vehicle computing system can determine, based at least in part on the one or more predicted locations of the one or more objects, a travel path for a vehicle in which the travel path does not traverse the one or more predicted locations of the one or more objects at the time interval that the one or more objects are determined to be at the one or more predicted locations. For example, the vehicle computing system can determine the size of the vehicle and determine a travel path from a starting location of the vehicle to a destination location of the vehicle that is able to accommodate the size of the vehicle without intersecting any of the objects at the one or more predicted locations.

In some embodiments, the vehicle computing system can control one or more vehicle systems associated with a vehicle based at least in part on the one or more predicted locations of the one or more objects. Further, the vehicle computing system can generate one or more control signals that are used to activate and/or control various vehicle systems and/or vehicle components including vehicle engine systems, vehicle steering systems, and/or vehicle braking systems. For example, based on the one or more predicted locations of the one or more objects, the vehicle computing system can bring a vehicle to a stop by controlling a vehicle braking system when the current travel path of the vehicle will be blocked by an object that will be at a predicted location.

In some embodiments, the vehicle computing system can generate and/or utilize the machine-learned tracking and kinematics model that is trained based at least in part on training data including a plurality of sensor observations of a plurality of training objects traversing a plurality of paths at a plurality of velocities or a plurality of accelerations. Further, each training object of the plurality of training objects can be associated with a plurality of respective object labels including a distance between a front wheel axle and a rear wheel axle of each training object. For example, the machine-learned tracking and kinematics model can be generated based in part on training data from LiDAR devices that generate LiDAR point clouds representative of the state of vehicles in an environment. Each of the vehicles can be associated with object labels indicating the type of vehicle and the distance between the front wheel axle and the rear wheel axle of each vehicle.

In accordance with some example embodiments, a machine-learned model and/or machine-learned neural network can include one or more tracking layers and one or more kinematics layers. The neural network can output one or more predicted object (e.g., vehicle) controls at each of a plurality of subsequent (e.g., future) times (e.g., timestamps). The one or more predicted control inputs can include longitudinal acceleration and/or a steering angle in some examples. The one or more kinematics layers can compute one or more future states for each object based on the one or more predicted control inputs. Given the object's current state (e.g., including an orientation and velocity) and the one or more predicted controls, the network can compute the object's state at a next timestamp.

In accordance with some example embodiments, a computing system (e.g., the vehicle computing system) can include one or more processors; one or more non-transitory computer-readable media that store: a machine-learned model (e.g., a machine-learned neural network) that comprises one or more tracking layers and one or more kinematics layers. At least one kinematics layer of the one or more kinematics layers can be configured to generate data indicative of one or more predicted controls for one or more objects based at least in part on data indicative of object trajectory generated by the one or more tracking layers and one or more physical constraints associated with each of the one or more objects respectively. The computing system can also include instructions (e.g., computer readable instructions) that, when executed by the one or more processors, cause the computing system to perform operations.

The operations performed by the computing system can include obtaining and/or accessing data indicative of a current state associated with each of the one or more objects. The operations can also include implementing the machine learned model (e.g., the machine-learned tracking and kinematics model) to process the data indicative of a current state associated with each of the one or more objects. Furthermore, the computing system can perform operations including receiving an output of the machine-learned model. The output of the machine-learned model that is received by the computing system can include data indicative of a predicted state for each of the one or more objects respectively.

In some embodiments, the one or more kinematics layers can be configured to generate the data indicative of the one or more predicted controls for the one or more objects at each of a plurality of future times. Further, in some embodiments, the one or more predicted controls can be generated based at least in part on the one or more physical constraints.

The systems, methods, devices, and non-transitory computer-readable media in the disclosed technology can provide a variety of technical effects and benefits to the overall operation of a vehicle and motion prediction in particular. By more effectively predicting the locations of objects through use of one or more machine-learned models that take into account kinematic properties of the objects, the disclosed technology can provide various benefits including more accurate motion prediction, faster motion prediction, improved scalability, reduced wear and tear on a vehicle, greater fuel efficiency, improved safety, and/or an overall improvement in the utilization of computational resources that results from a reduction in the determination of extraneous (e.g., physically impossible) object locations.

The disclosed technology can achieve more accurate and/or faster prediction of object locations by leveraging the use of one or more machine-learned models (e.g., the machine-learned tracking and kinematics model). The one or more machine-learned models can be trained to predict objects locations based at least in part on the physics and physical constraints of objects that are detected. For example, by constraining predicted locations of objects based on physical constraints of the object, the number of inaccurate (e.g., physically impossible) predictions is reduced. Further, by constraining the predicted locations, the speed of prediction can be increased due to the application of available computing resources to a smaller set of potential predicted locations.

Furthermore, by using the one or more machine-learned models, the disclosed technology has the additional advantage of improved scalability. In particular, a machine-learned mode that can be retrained using an additional set of training data can be improved without the laborious manual derivations and adjustments that are often required in rules-based models or heuristic models that do not use machine-learning. For example, in a manually derived rules based model, a human designer would need to manually derive heuristic models that determine the way in which different objects move differently in various environments. As such, the task of creating and adjusting a heuristic model can be onerous relative to using a machine-learned model that is trained using training datasets. Further, the one or more machine-learned models in the disclosed technology can be trained using relevant training data (e.g., vehicles on roads), which can be done on a massive scale. Additionally, the one or more machine-learned models can readily revised as new training data becomes available or new uses for the one or more machine-learned models are envisioned.

The disclosed technology can also improve the operation of the vehicle by reducing the amount of wear and tear on vehicle components through more gradual adjustments in the vehicle's travel path that can be performed based on the more accurate and/or more precise predicted locations of objects in the environment surrounding the vehicle. For example, more accurate determination of the objects motion paths can result in a smoother ride (e.g., fewer sudden course changes) that reduce strain on a vehicle's engine, braking, and steering systems. Additionally, the smoother adjustments by the vehicle (e.g., more gradual turns and acceleration) can result in improved passenger comfort when the vehicle is in transit.

The disclosed technology can further improve the operation of the vehicle by improving the fuel efficiency of a vehicle. For example, more accurate and/or precise prediction of object locations can result in a shorter travel path and/or a travel path that requires less acceleration, thereby achieving a reduction in the amount of energy (e.g., fuel or battery power) that is required to operate the vehicle.

Additionally, more effective determination of object locations can allow for an improvement in safety for passengers inside a vehicle as well as those outside the vehicle (e.g., pedestrians, cyclists, and passengers of other vehicles). For example, the disclosed technology can more effectively avoid unintentional contact with other objects (e.g., by steering the vehicle away from the predicted locations of objects) through improved prediction of the location of objects. Further, the disclosed technology can activate notification systems (e.g., activate a vehicle horn and/or activate a vehicle signal light) to notify pedestrians, cyclists, and other vehicles of their respective locations with respect to the location of the vehicle.

The disclosed technology can reduce the computational resources needed to determine the future locations of objects by using object physics to constrain potential paths of objects. For example, instead of determining every possible path that objects can travel based on their current trajectories, the disclosed technology can use the physical characteristics of the objects to constrain the possible paths to those that are physically possible for the object to traverse.

Accordingly, the disclosed technology provides improved prediction of the locations of detected objects. Operational benefits of the disclosed technology include more accurate motion prediction, faster motion prediction, improved scalability, reduced wear and tear on a vehicle, greater fuel efficiency, improved safety, and/or an overall improvement in the utilization of computational resources.

With reference now to FIGS. 1-10, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

Figure 5:
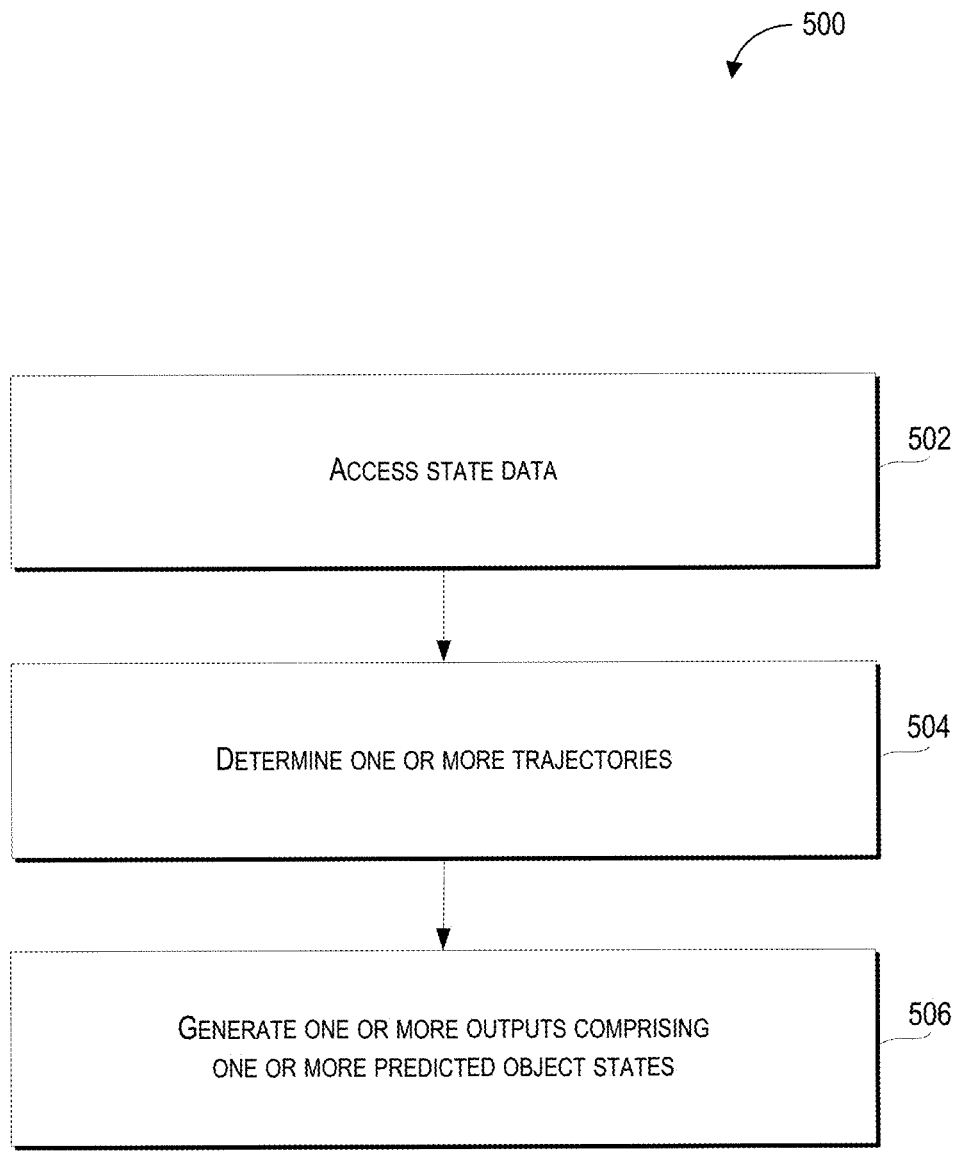
FIG. 5 depicts a flow diagram of an example method of motion prediction according to example embodiments of the present disclosure.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform operations and/or functions associated with operation of a vehicle including accessing state data including information associated with one or more respective locations and/or characteristics of one or more objects over a plurality of time intervals; determining, based at least in part on the state data and a machine-learned tracking and kinematics model (e.g., the machine-learned tracking and kinematics model described in the method 500 that is depicted in FIG. 5), one or more trajectories of the one or more objects at one or more subsequent time intervals following the plurality of time intervals, the one or more trajectories of the one or more objects at the one or more subsequent time intervals can include one or more predicted locations of the one or more objects at the one or more subsequent time intervals; and/or generating one or more outputs including one or more predicted object states based at least in part on the one or more predicted locations of the one or more objects at the one or more subsequent time intervals.

For example, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a latitude and longitude of an object detected by the one or more sensors 114 of the vehicle 108), the state of a vehicle (e.g., the velocity, acceleration, and/or location of the vehicle 108), or the state of objects external to a vehicle (e.g., the physical dimensions, velocity, acceleration, heading, location, position, shape, and/or appearance of one or more objects external to the vehicle).

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, a heading, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for accessing state data including information associated with one or more respective locations and/or characteristics of one or more objects over a plurality of time intervals; determining, based at least in part on the state data and a machine-learned tracking and kinematics model, one or more trajectories of the one or more objects at one or more subsequent time intervals following the plurality of time intervals; and/or generating one or more outputs including one or more predicted object states based at least in part on the one or more predicted locations of the one or more objects at the one or more subsequent time intervals. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
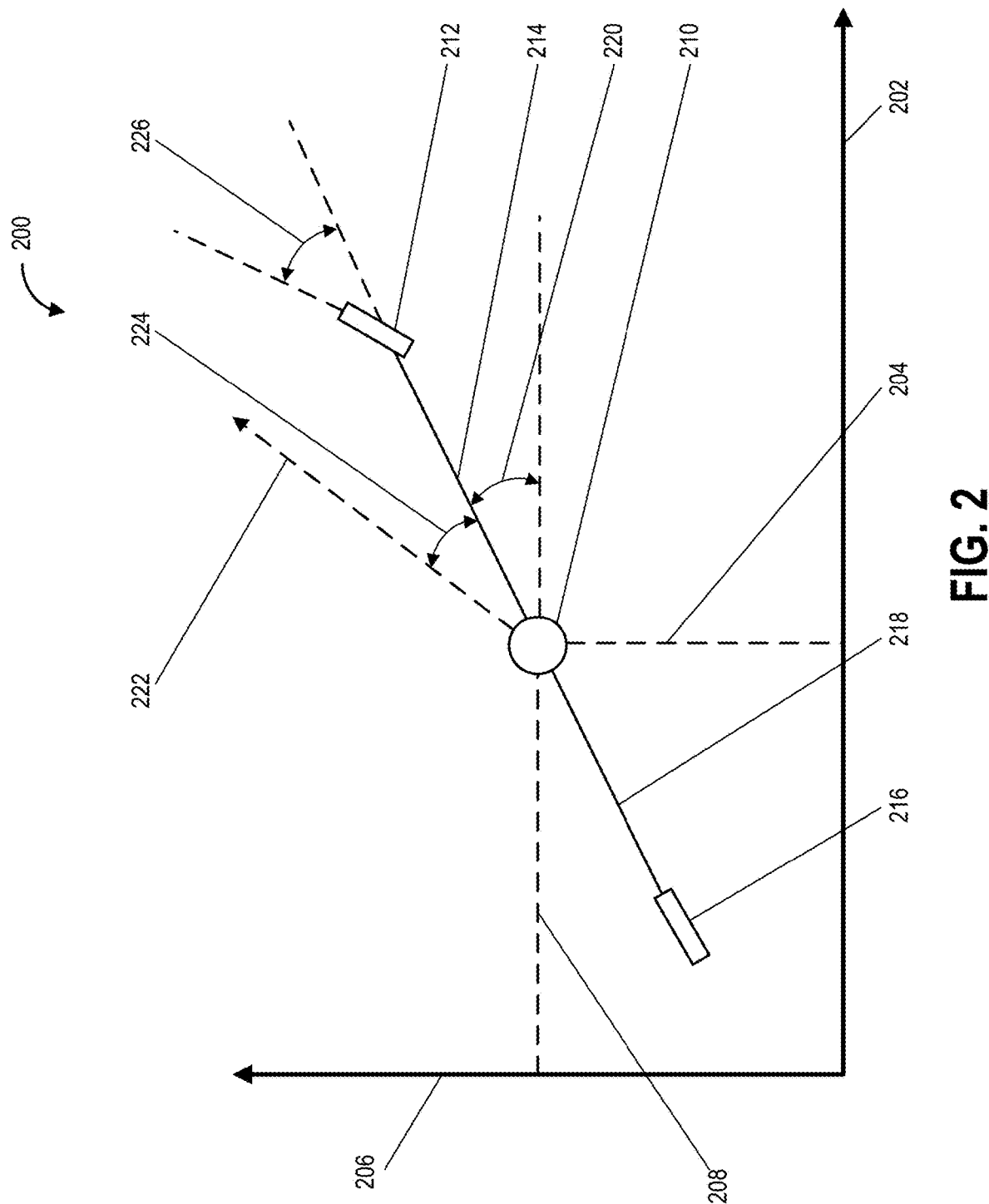
FIG. 2 depicts an example aspect of motion prediction according to example embodiments of the present disclosure.

FIG. 2 depicts an example aspect of motion prediction according to example embodiments of the present disclosure. One or more operations and/or functions or operations in FIG. 2 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As illustrated, FIG. 2 shows an example of a kinematics model 200 that includes an x axis 202, an x position 204, a y axis 206, a y position 208, an object center 210, a front wheel 212, a front wheel to center distance 214, a rear wheel 216, a rear wheel to center distance 218, a heading 220, a velocity vector 222, an angle 224, and a steering angle 226.

The kinematics model 200 can be used to encode information including the kinematics of an object which can include a single-axle vehicle, a two-axle vehicle, and/or multiple-axle vehicle with more than two-axles. For example, the object can be a two-axle vehicle in which one axle of the vehicle is rotatable and the other axle is fixed; or a multiple-axle vehicle in which two or more axles of the vehicle are rotatable. A motorcycle or bicycle with a fixed rear axle and a rotatable front axle are examples of a two-axle vehicle. Examples of objects with more than two axles include an articulated bus and/or a two-axle vehicle towing a trailer with one or more axles. In this example, the kinematics model 200 is used to encode the kinematics of a two-axle vehicle (e.g., the vehicle 108) in which the front wheel 212 is associated with a rotatable axle that can turn in different directions and the rear wheel 216 is associated with a fixed axle that does not turn in different directions. As illustrated, the x axis 202 and the y axis 206 can be used as points of reference to show the heading 220 of the object. In some embodiments, the kinematics model 200 can be embedded in a machine-learning tracking and kinematics model that is used to determine various aspects of object motion including the velocity and heading of the object over time. Furthermore, in some embodiments, the kinematics model 200 can be included as part of one or more layers of the machine-learned tracking and kinematics model. For example, the kinematics model 200 can be included in any of the machine-learned tracking and kinematics models herein including the machine-learned tracking and kinematics models described in the methods 500-800 that are depicted in FIGS. 5-8.

In some embodiments, the kinematics model 200 can determine the motion of an object at a time $t_j$ by using a machine-learning kinematic node of the kinematics model 200 at horizon h (e.g., a prediction horizon spanning one or more time intervals subsequent to the time $t_j$) to implement the following function that determines motion of an object at time $t_{j+h}$; $s_{i(j+h+1)} = f(s_{i(j+h)}, \alpha_{i(j+h)}, \gamma_{i(j+h)})$. In the preceding function, $s_{i(j+h)}$ is a state of an object including the x position 204 of the object represented by $x_{i(j+h)}$, the y position 208 of the object represented by $y_{i(j+h)}$, the velocity of the object represented by $v_{i(j+h)}$, and the heading 220 of the object which can be represented by $\Psi_{i(j+h)}$; $\alpha_{i(j+h)}$ which is a scalar representing longitudinal acceleration of the object; and the steering angle 226 of the object can be represented by $\gamma_{i(j+h)}$ which is a scalar representing the steering angle 226 at time $t_{j+h}$. By way of example, the steering angle 226 can be associated with the angle of the front wheel 212 that is determined by an input to a steering device of the corresponding object. In some embodiments, the x position 204 and the y position 208 can be based at least in part on the velocity vector 222 and the angle 224 which is the angle between the velocity vector 222 and the line demarcating the front wheel to center distance 214. Furthermore, in some embodiments, the heading 220 can be based at least in part on the velocity vector 222, the rear wheel to center distance 218, and the angle 224.

In some embodiments, the heading 220 and the steering angle 226 can be constrained based at least in part on one or more physical constraints of an object travelling along the heading 220 using the steering angle 226. For example, the longitudinal acceleration ($\alpha_{i(j+h)}$ can be constrained to −8 to +4 m/s² and the steering angle 226 can be constrained to ±45 degrees.

In some embodiments, the kinematics model 200 can be used as part of a kinematics layer in a machine-learned model that is used to determine the motion of an object. For example, a first node of the machine-learned model at h=0 can receive the state at current time $t_j$ as input, and subsequent nodes of the machine-learned model can receive the output of the preceding nodes as an input. The motion of the object can be based at least in part on the output of the final node in the machine-learned model.

Figure 3:
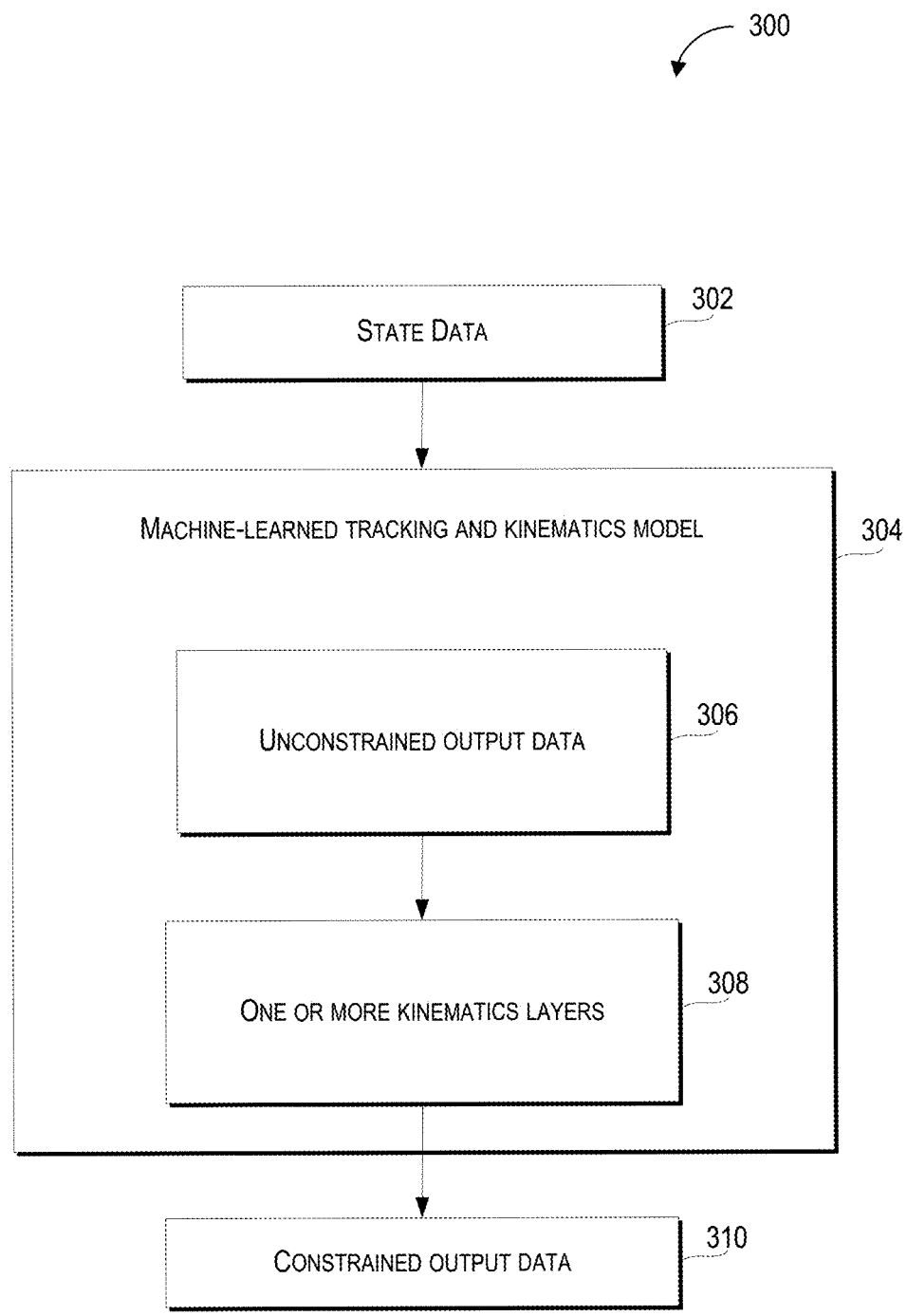
FIG. 3 depicts an example aspect of motion prediction according to example embodiments of the present disclosure.

FIG. 3 depicts an example aspect of motion prediction according to example embodiments of the present disclosure. One or more operations and/or functions in FIG. 3 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows an example of a motion tracking system 300 that includes state data 302, a machine-learned tracking and kinematics model 304, unconstrained output data 306, one or more kinematics layers 308, and constrained output data 310.

In this example, the machine-learned tracking and kinematics model 304 can receive the state data 302 as an input. The state data 302 can include data and/or information associated with various states of an environment. Further, the state data 302 can include: map data that indicates roads, crosswalks, lane directions, the locations of objects in an environment, and/or other information associated with the state of an environment; one or more states of one or more detected objects and/or tracked objects in the environment including the location, acceleration, heading, trajectory, and/or velocity of the one or more tracked objects; the acceleration of a tracking object in the environment; and the steering angle of the tracking object in the environment. Furthermore, the state data 302 can include data associated with the one or more states of the environment over time including, for example, the one or more states of one or more objects in an environment over a plurality of time intervals. For example, the tracking object can be the vehicle 108 that is depicted in FIG. 1, and the one or more tracked objects can include one or more objects external to the vehicle 108 that are detected by the one or more sensors 114. Further, the one or more tracked objects can be tracked over a plurality of time intervals by the vehicle computing system 112. By way of further example, the steering angle of the tracking object can be the angle of one or more wheels that can be turned to change the direction of the object when the object is in motion. Furthermore, the vehicle computing system 112 can use the machine-learned tracking and kinematics model 304 to determine the steering angle of tracked objects.

The machine-learned tracking and kinematics model 304 can include a convolutional neural network, a recursive neural network, and/or a recurrent neural network, each of which can include a plurality of layers. Each of the plurality of layers of the machine-learned tracking and kinematics model 304 can: receive an input (e.g., the state data which can include information associated with the state of an environment as input for the first layer and one or more feature maps as input for the remaining layers subsequent to the first layer); perform some operations on the input (e.g., evaluate one or more variables, attributes, and/or aspects of the input based at least in part on one or more parameters); and generate an output based on the operations performed on the input (e.g., generate a predicted motion of a tracking object and one or more tracked objects external to the tracking object). For intermediate layers, the output can include one or more feature maps that can be provided as an input for another layer (e.g., an immediately subsequent layer). The machine-learned tracking and kinematics model 304 can include the one or more kinematics layers 308 which can receive one or more inputs including the unconstrained output data 306 which can include information associated with the plurality of layers preceding the kinematics layer 308. For example, the unconstrained output data 306 can include information associated with the one or more feature maps generated by the plurality of layers preceding the kinematics layer 308. Based at least in part on the input of the unconstrained output data 306, the one or more kinematics layers 308 can generate the constrained output data 310. The constrained output data 310 can include information associated with the predicted motion of the tracking object and the one or more tracked objects external to the tracking object. For example, the constrained output data can include one or more trajectories of the one or more tracked objects in the environment. The one or more trajectories of the one or more tracked objects in can include predicted locations of one or more tracked objects in the environment.

Figure 4:
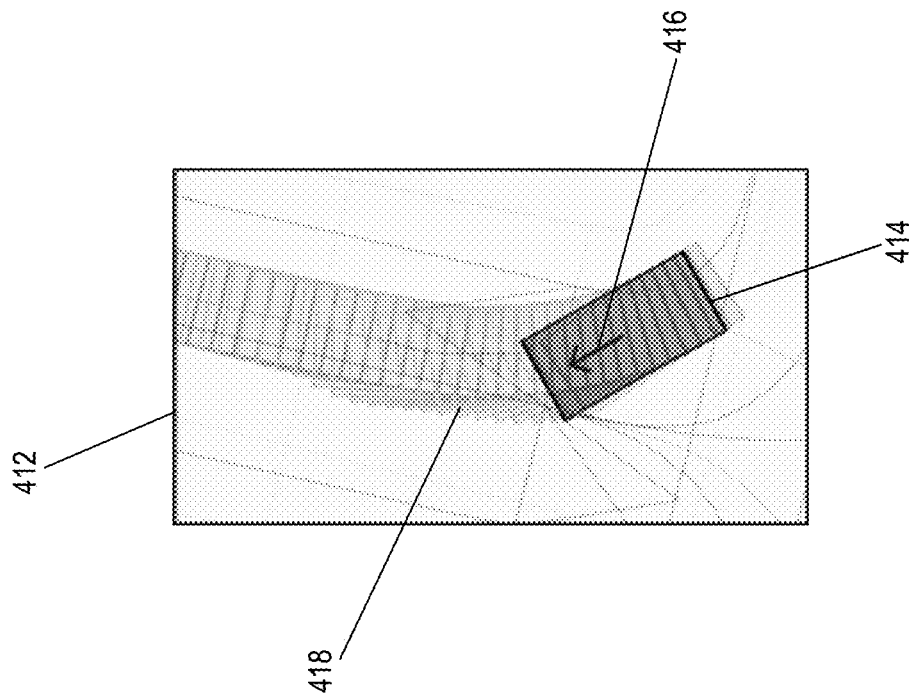
FIG. 4 depicts an example aspect of motion prediction according to example embodiments of the present disclosure.
Figure 4:
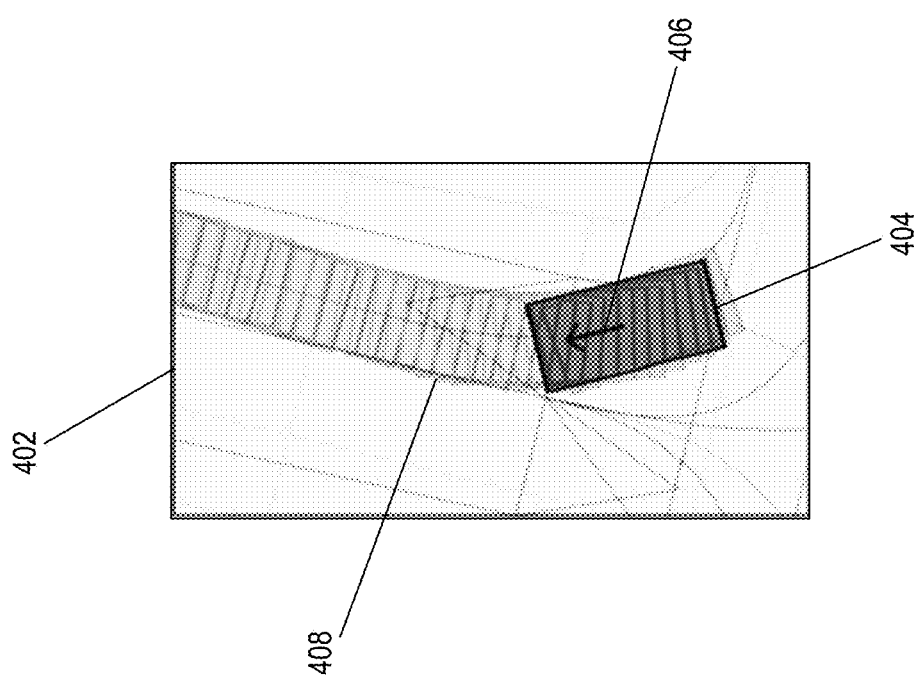

FIG. 4 depicts an example aspect of motion prediction according to example embodiments of the present disclosure. One or more operations and/or functions in FIG. 4 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 4 can include one or more features of one or more devices and/or systems including, for example, the operations computing system 104, the vehicle 108, or the vehicle computing system 112, which are depicted in FIG. 1.

As illustrated, FIG. 4 shows the environment 402, the object 404, the heading 406, the object tracks 408, the environment 412, the object 414, the heading 416, and the object tracks 418. The object 404 and the object 414 can include one or more attributes and/or capabilities of the vehicle 108 that is depicted in FIG. 1.

The environment 402 depicts the motion of the object 404, which can be described by the object tracks 408 which indicate a plurality of predicted positions of the object 404 after the object 404 makes a right turn relative to the previous heading 416. In some embodiments, the motion of the object 404 can be based at least in part on output from a machine-learned model that is not configured and/or trained to determine object motion based on physical constraints.

The environment 412 depicts the motion of the object 414, which can be described by the object tracks 418 which indicate a plurality of predicted positions of the object 414 after the object 404 makes a right turn relative to the previous heading 416. The motion of the object 414 can be based at least in part on output from a machine-learned tracking and kinematics model that determines object motion based on physical constraints associated with an object.

For example, the motion of the object 414 can be determined based at least in part on the physical attributes of the object and the environment surrounding the object including the mass of the object, one or more physical dimensions of the object, the maximum acceleration and deceleration of the object, and/or the maximum turning radius of the object. By way of further example, all other things being equal, an object will be able to round a corner less sharply as the velocity of the object increases. Further, all other things being equal, an object such as an eighteen wheel truck will be able to turn less sharply when fully loaded with heavy machinery than when the truck is not loaded and has a mass that is less than half the fully loaded mass. Furthermore, the motion of the object 414 can be determined based at least in part on use of the machine-learned tracking and kinematics model 304 that is depicted in FIG. 3 and/or the machine-learned tracking and kinematics models described in the methods 500-800 that are depicted in FIGS. 5-8.

FIG. 5 depicts a flow diagram of an example method of motion prediction according to example embodiments of the present disclosure. One or more portions of a method 500 can be implemented by one or more devices (e.g., one or more computing devices) or systems including, for example, the operations computing system 104, the vehicle 108, or the vehicle computing system 112, shown in FIG. 1. Moreover, one or more portions of the method 500 can be implemented as an algorithm on the hardware components of the devices described herein (e.g., as in FIG. 1) to, for example, generate outputs including predicted locations of objects. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include accessing state data. The state data can include information associated with one or more locations and/or one or more characteristics of one or more objects over a plurality of time intervals. In some embodiments, the state data can include information associated with one or more respective locations and/or characteristics of one or more objects over a plurality of time intervals. The state data can include information associated with any combination of the one or more objects including each object individually, some of the objects, and/or all of the objects.

In some embodiments, the one or more locations can include: one or more geographical locations including latitude, longitude, and/or altitude; and/or a location relative to some point of reference including a distance and set of angles relative to the point of reference. For example, the one or more locations can include a distance of an object from a sensor and a set of angles of the object with respect to the sensor.

In some embodiments, the state data can include information associated with the position and/or placement of the one or more objects including an orientation, bearings, and/or direction. The position of the one or more objects can be used to determine what direction an object or some portion of an object is facing, whether an object is upright, and/or whether an object is on its side. For example, the position of an object can indicate that a front portion of the object, such as the front of an automobile, is oriented in a particular direction.

In some embodiments, the one or more characteristics of the one or more objects can include at least one of a plurality of physical dimensions, one or more shapes, acceleration, and/or a velocity, a heading, and/or a heading rate of change. Further, in some embodiments, the one or more characteristics of the one or more objects can include a mass, weight, and/or traction (e.g., wheel traction). For example, the one or more characteristics of the one or more objects can include the velocity and heading of a vehicle object detected by the one or more sensors 114 associated with the vehicle computing system 112.

In some embodiments, the plurality of physical dimensions can include a distance between a front wheel axle and a rear wheel axle of an object of the one or more objects. For example, the plurality of physical dimensions can include the distance in meters between the front wheel axle of a vehicle object and the rear wheel axle of a vehicle object. By way of further example, the front wheel to center distance 214 and the rear wheel to center distance 218 that are depicted in FIG. 2 are examples of the plurality of physical dimensions. In some embodiments, the plurality of physical dimensions can include the length of an axle (e.g., the distance between a right wheel and a left wheel on the same axle).

In some embodiments, the one or more objects can include one or more vehicles with a fixed rear wheel axle and a moveable front wheel axle. For example, the one or more objects can include vehicles including automobiles, motorcycles, mopeds, light electric vehicles, and/or bicycles with a moveable front wheel axle that is used to determine a direction of travel for the vehicles (e.g., turning the front wheel axle to the left to change a vehicle's direction of travel to the left).

In some embodiments, the state data can be based at least in part on one or more outputs from one or more sensors including at least one of one or more light detection and ranging devices (LiDAR), one or more radar devices, one or more sonar devices, one or more thermal sensors, and/or one or more image sensors.

In some embodiments, the one or more sensors can be positioned to provide a bird's eye view of the one or more objects. For example, the one or more sensors 114 can be positioned on the roof of the vehicle 108 that is associated with the vehicle computing system 112. Sensor data can be transformed into one or more view perspectives, (e.g., a bird's eye view) in various ways including a transformation algorithm and/or projection techniques. A bird's eye view of the one or more objects can allow for more effective determination of the physical dimensions of an object (e.g., the length and width of vehicle may be more readily discerned from a bird's eye view in comparison to a front view or side view of the vehicle).

In some embodiments, the state data can include one or more rasterized RGB images of an environment detected by the one or more sensors. For example, the vehicle computing system 112 can generate rasterized RGB images of the environment based at least in part on the one or more sensor outputs of the one or more sensors. The use of rasterized RGB images may allow for improved determination of features (by the machine-learned tracking and kinematics model) of the one or more objects including physical dimensions and/or shapes of the one or more objects.

At 504, the method 500 can include determining one or more trajectories of the one or more objects at one or more subsequent time intervals following the plurality of time intervals. In some embodiments, the one or more trajectories of the one or more objects at the one or more subsequent time intervals following the plurality of time intervals can be determined based at least in part on the state data and a machine-learned tracking and kinematics model which can include one or more machine-learned tracking models; one or more machine-learned kinematics models; and/or one or more layers of the one or more machine-learned tracking models and/or the one or more machine-learned kinematics models. For example, the state data (e.g., state data including one or more images of an environment including the one or more objects over the plurality of time intervals) can be provided as an input to the machine-learned tracking and kinematics model, which has been trained to receive the input and generate an output including one or more trajectories of the one or more objects at one or more subsequent time intervals following the plurality of time intervals.

In some embodiments, the one or more trajectories of the one or more objects at the one or more subsequent time intervals can include one or more predicted locations of the one or more objects at the one or more subsequent time intervals. The one or more predicted locations (e.g., geographic locations and/or locations relative to a point of reference which can include the vehicle computing system 112 or the one or more sensors 114 associated with the vehicle computing system 112) of the one or more objects can be based at least in part on one or more physical constraints of the one or more objects.

In some embodiments, the machine-learned tracking and kinematics model can include at least one of a convolutional neural network, a recurrent neural network, a recursive neural network, a decision tree, logistic regression model, a support vector machine, and/or other types of neural networks and/or machine-learning models.

In some embodiments, the machine-learned tracking and kinematics model can be configured and/or trained based at least in part on training data. The training data can include a plurality of sensor observations of a plurality of training objects traversing a plurality of paths at a plurality of velocities or a plurality of accelerations. Further, each training object of the plurality of training objects can be associated with a plurality of respective object labels including a distance between a front wheel axle and a rear wheel axle of each training object.

For example, the machine-learned tracking and kinematics model can be configured and/or trained based at least in part on training data from camera devices that generate a plurality of images representative of the state of one or more objects (e.g., vehicles) in an environment. Each of the objects can be associated with respective object labels indicating the type of object (e.g., the type of vehicle) and the distance between the front wheel axle and a center of the object and the rear wheel axle and the center of each object. The effectiveness of the machine-learned tracking and kinematics model in determining trajectories of tracked objects can be improved based at least in part on evaluation and minimization of one or more loss functions that include one or more parameters associated with the tracked objects (e.g., parameters associated with motion characteristics and/or physical dimensions of the tracked objects).

By way of example, the loss can be based on evaluation of a loss function associated with the accuracy of the trajectories determined by the machine-learned tracking and kinematics model relative to ground-truth trajectories of the objects. After each of the iterations of performing operations on the training data and determining the loss, the computing system can adjust parameters of the machine-learned tracking and kinematics model based at least in part on the loss. For example, the computing system can adjust parameters of the machine-learned tracking and kinematics model. Furthermore, parameters of the machine-learned tracking and kinematics model can be weighted in proportion to their contribution to decreasing the loss so that parameters that contribute more to reducing the loss are weighted more heavily. As such, the computing system can generate more effective machine-learned models that can be used to more accurately predict the motion of objects.

As part of training the machine-learned tracking and kinematics model, one or more parameters of the machine-learned tracking and kinematics model can be adjusted based at least in part on the loss. For example, the one or more parameters of the machine-learned tracking and kinematics model that do not change the loss (e.g., cause the loss to increase or decrease) may be kept the same (e.g., not adjusted), the one or more parameters that decrease the loss can be weighted more heavily (e.g., adjusted to increase their contribution to the loss), and the one or more parameters that increase the loss can have their weighting reduced (e.g., adjusted to reduce their contribution to the loss). Accordingly, adjustment of the one or more parameters of the machine-learned tracking and kinematics model over a plurality of iterations can result in a lower loss that can correspond to more accurate determination of the trajectory of objects relative to the ground-truth trajectories of the objects.

In some embodiments, the machine-learned tracking and kinematics model can be configured and/or trained to learn one or more parameters. For example, the machine-learned tracking and kinematics model can learn parameters including parameters associated with the type of object, motion characteristics of the object, and/or attributes of the objects (e.g., physical dimensions of objects). Further, in some embodiments, the machine-learned tracking and kinematics model can learn the one or more parameters without use of object labels or other ground-truth information. For example, the machine-learned tracking and kinematics model can engage in unsupervised learning in which the machine-learned tracking and kinematics model can learn and/or infer one or more parameters based on the training data.

In some embodiments, the machine-learned tracking and kinematics model can include one or more tracking layers and one or more kinematics layers. The machine-learned tracking and kinematics model can output one or more predicted object (e.g., vehicle) controls at each of a plurality of subsequent (e.g., future) times intervals. The one or more predicted control inputs can include longitudinal acceleration and/or a steering angle which in some examples can correspond to control inputs associated with an accelerator and a steering wheel respectively. The one or more kinematics layers can be used to determine one or more future states for each object based on the one or more predicted control inputs. Given the object's current state (e.g., including a heading and velocity of an object) and the one or more predicted controls, the machine-learned tracking and kinematics model can determine the object's state at a subsequent time interval.

In some embodiments, the one or more kinematics layers of the machine-learned tracking and kinematics model can be configured and/or trained to generate data indicative of the one or more predicted controls for the one or more objects at each of a plurality of future times. Further, in some embodiments, the one or more predicted controls can be generated based at least in part on the one or more physical constraints of the one or more objects.

In some embodiments, the machine-learned tracking and kinematics model can use one or more dynamic equations that can use physical characteristics of objects including the mass of an object as one of the constraints on an object's motions. Further, the one or more dynamic equations can use any of the one or more physical constraints described herein.

At 506, the method 500 can include generating one or more outputs. The one or more outputs can include one or more predicted object states that can be based at least in part on the one or more predicted locations of the one or more objects at the one or more subsequent time intervals. For example, the vehicle computing system 112 can generate one or more outputs including one or more predicted object states that indicate the predicted state (e.g., the velocity, acceleration, location, and/or heading) of the vehicle 108 and/or one or more objects external to the vehicle 108 at a subsequent time interval. The predicted state of the object can be used to perform one or more operations including operations associated with motion planning for a vehicle (e.g., determining a travel path for a vehicle that does not intersect any of the one or more predicted locations of the one or more objects).

By way of further example, the vehicle computing system 112 can generate one or more outputs including one or more signals that can be used to perform one or more operations associated with activating and/or controlling one or more vehicle systems including a vehicle motor system, a vehicle steering system, and/or a vehicle braking system.

Figure 6:
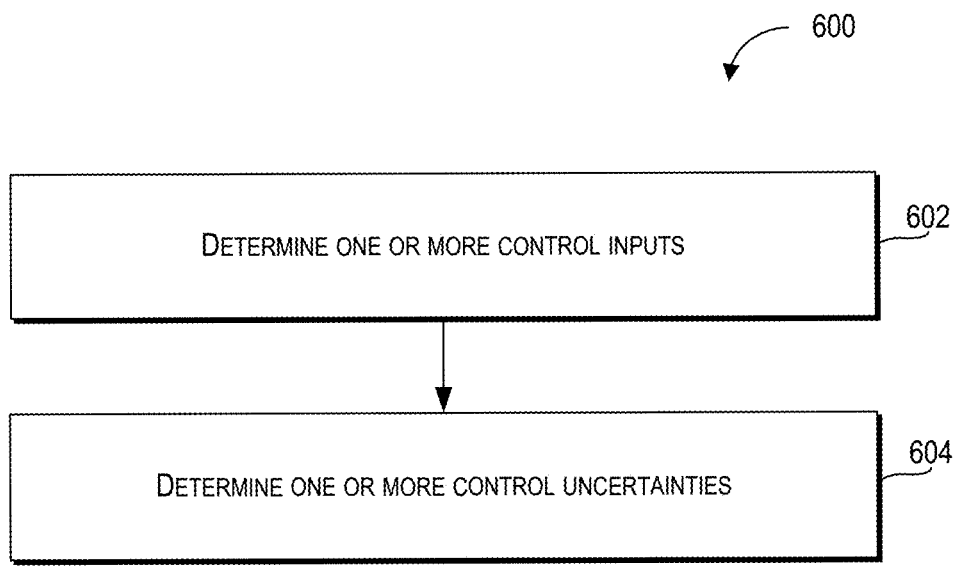
FIG. 6 depicts a flow diagram of an example method of motion prediction according to example embodiments of the present disclosure.

FIG. 6 depicts a flow diagram of an example method of motion prediction according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1) to, for example, generate outputs including predicted locations of objects. In some embodiments, one or more portions of the method 600 can be performed as part of the method 500 that is depicted in FIG. 5. Further, one or more portions of the method 600 can be performed as part of determining one or more trajectories of the one or more objects based at least in part on the state data and the machine-learned tracking and kinematics model as described in 504 of the method 500. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include determining one or more control inputs for each of the one or more objects based at least in part on the one or more trajectories of each of the one or more objects. The one or more control inputs can include an input to one or more control devices of an object (e.g., a control device of a vehicle). The one or more control inputs can include one or more acceleration inputs that can be used on an accelerator device; one or more braking inputs that can be used on a braking device; and/or one or more steering inputs that can be used on a steering device. The steering device can include one or more steering wheels, one or more control sticks, one or more joysticks, and/or one or more touch sensitive steering panels. Further, the one or more control devices can be configured in different shapes in including circular (e.g., wheel shaped), rectangular, square, or oval.

The one or more control devices can also be configured to receive different types of control inputs including one or more tactile inputs, one or more auditory inputs, and/or one or more visual inputs. The one or more tactile inputs to the one or more control devices can include turning, rotating, spinning, pushing, pulling, pressing, depressing, and/or sliding. For example, a steering device including a steering wheel can be controlled by turning the steering wheel; an accelerator device can be controlled by pushing or releasing the accelerator device; and/or a braking device including a brake pedal can be controlled by pushing/depressing the brake pedal. Furthermore, the one or more auditory inputs to the one or more control devices can include one or more voice commands, and the one or more visual inputs can include one or more gestures and/or one or more gazes.

By way of example, the one or more control inputs can include a control input to a control device including a steering device of the vehicle 108 that is used to determine the direction of travel of the vehicle 108. By way of further example, the one or more control inputs can include an input to a control device including an accelerator device of the vehicle 108 that is used to control acceleration of the vehicle 108. Further, the one or more control inputs to the accelerator device can be associated with a magnitude of longitudinal acceleration including positive acceleration (e.g., a control input including an accelerator input that causes a vehicle to increase its acceleration) or negative acceleration (e.g., a control input that causes a vehicle to decrease its acceleration). Additionally, the one or more control inputs to the braking device can also be associated with a negative acceleration (e.g., a control input including an accelerator input that causes a vehicle to increase its acceleration) that can halt the movement of the vehicle 108. Furthermore, the one or more control inputs to the steering device can include an input to a control device including a steering device of the vehicle 108 that can be used to control the direction of travel of the vehicle 108.

In some embodiments, the one or more control devices can include a steering device and one or more control inputs can include a left turn of the one or more control devices or a right turn of the one or more control devices. For example, based on a control input to turn an object (e.g., a vehicle) ten degrees to the left, the vehicle computing system 112 can generate one or more control signals that are transmitted to a motor that operates a front wheel axle of a vehicle and can turn the front wheel axle of the vehicle ten degrees to the left.

At 604, the method 600 can include determining one or more control uncertainties respectively associated with the one or more control inputs of each of the one or more objects at the one or more subsequent time intervals. Each of the one or more control uncertainties can be associated with a magnitude or degree of uncertainty for the one or more control inputs for each of the one or more objects at the one or more subsequent time intervals. For example, the one or more control uncertainties for the degree of uncertainty of a control input that is a steering wheel can be expressed as a number of degrees to the left or right of a determined control input (e.g., plus or minus five degrees from an initial position of the steering wheel determined by the vehicle computing system 112).

Figure 7:
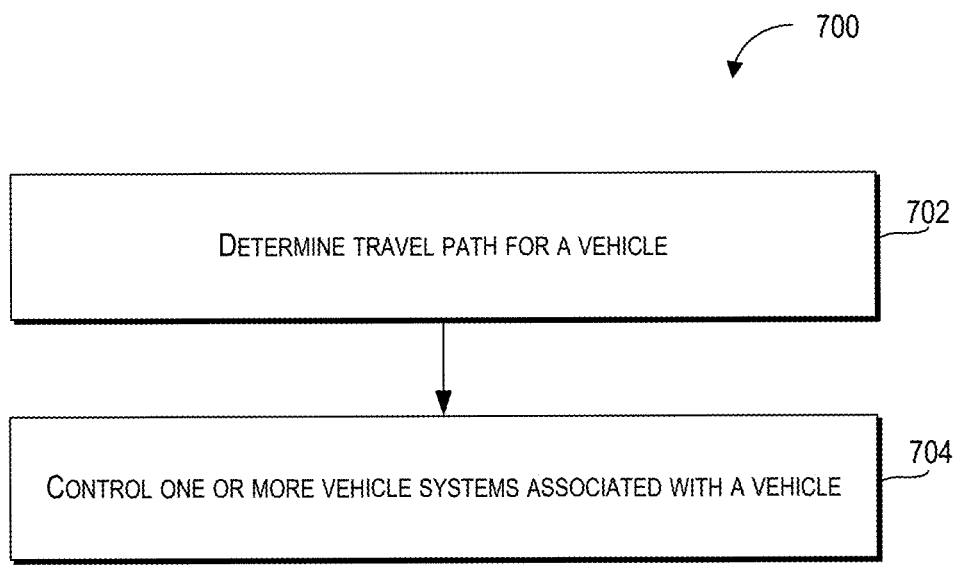
FIG. 7 depicts a flow diagram of an example method of motion prediction according to example embodiments of the present disclosure.

FIG. 7 depicts a flow diagram of an example method of motion prediction according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1) to, for example, generate outputs including predicted locations of objects. In some embodiments, one or more portions of the method 700 can be performed as part of the method 500 that is depicted in FIG. 5. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include determining, based at least in part on the one or more predicted locations of the one or more objects, a travel path for a vehicle in which the travel path does not traverse the one or more predicted locations of the one or more objects at the time interval that the one or more objects are determined to be at the one or more predicted locations. In some embodiments, the travel path for the vehicle can be based at least in part on a minimum distance between the vehicle and the one or more predicted locations of the one or more objects at each respective time interval. For example, the vehicle computing system can generate a travel path in which the vehicle 108 will maintain a minimum distance of at least thirty-five centimeters away from the one or more objects.

By way of example, the vehicle computing system 112 can determine the size (e.g., physical dimensions and/or footprint) of the vehicle 108 and determine a travel path from a starting location of the vehicle 108 to a destination location of the vehicle 108 that is able to accommodate the size of the vehicle 108 without intersecting any of the one or more objects at the one or more predicted locations.

At 704, the method 700 can include controlling one or more vehicle systems associated with a vehicle based at least in part on the one or more predicted locations of the one or more objects. Further, one or more control signals that are used to activate and/or control various vehicle systems and/or vehicle components can be generated. The vehicle systems and/or vehicle components can include vehicle engine systems, vehicle motor systems, vehicle steering systems, and/or vehicle braking systems. For example, based on the one or more predicted locations of the one or more objects, the vehicle computing system 112 can control a vehicle steering system that is used to steer the vehicle 108 around an object that will be at a predicted location. Furthermore, the vehicle computing system 112 can control a vehicle braking system that is used to control the motion of the vehicle 108 as it travels around a corner. By way of further example, the vehicle computing system can control a vehicle motor system that is used to control the wheels of the vehicle 108, thereby allowing the vehicle 108 to travel from place to place.

Figure 8:
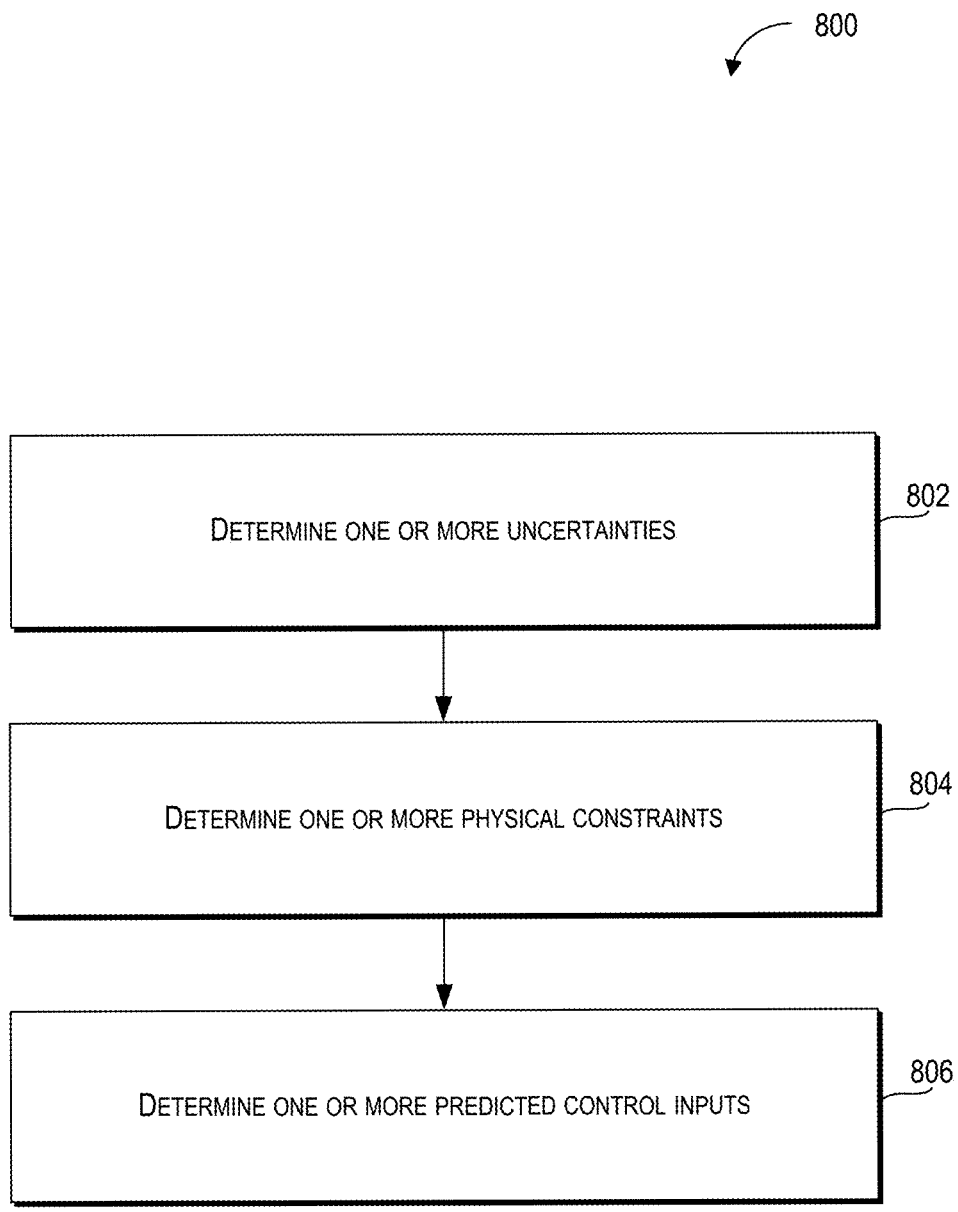
FIG. 8 depicts a flow diagram of an example method of motion prediction according to example embodiments of the present disclosure.

FIG. 8 depicts a flow diagram of an example method of motion prediction according to example embodiments of the present disclosure. One or more portions of a method 800 can be implemented by one or more devices (e.g., one or more computing devices) or systems including, for example, the operations computing system 104, the vehicle 108, or the vehicle computing system 112, shown in FIG. 1. Moreover, one or more portions of the method 800 can be implemented as an algorithm on the hardware components of the devices described herein (e.g., as in FIG. 1) to, for example, generate outputs including predicted locations of objects. In some embodiments, one or more portions of the method 800 can be performed as part of the method 500 that is depicted in FIG. 5. Further, one or more portions of the method 600 can be performed as part of determining one or more trajectories of the one or more objects based at least in part on the state data and the machine-learned tracking and kinematics model as described in 504 of the method 500. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include determining one or more uncertainties respectively associated with each of the one or more predicted locations of the one or more objects. In some embodiments, each of the one or more uncertainties can include and/or be associated with a respective range distance around each of the one or more predicted locations. Further, the uncertainty associated with the predicted location of an object can be positively correlated with the range distance around the object. For example, the vehicle computing system 112 can determine that an uncertainty associated with a predicted location is twenty centimeters around the predicted location that was determined (e.g., a twenty centimeter radius around the predicted location).

In some embodiments, the one or more uncertainties can include and/or be associated with a displacement error for a predicted trajectory of an object. The displacement error can be expressed as:

$$d_{i(j+h)} = \sqrt{(x_{i(j+h)} - \hat{x}_{i(j+h)}(\theta))^2 + (y_{i(j+h)} - \hat{y}_{i(j+h)}(\theta))^2}$$

in which the displacement error $d_{i(j+h)}$ at a horizon h is based at least in part on $(x_{i(j+h)} - \hat{x}_{i(j+h)}(\theta))^2$ which is associated with the distance between the predicted position of an object and an observed position of the object with respect to an x axis, and $(y_{i(j+h)} - \hat{y}_{i(j+h)}(\theta))^2$ which is associated with the distance between the predicted position of an object and an observed position of the object with respect to a y axis.

At 804, the method 800 can include determining the one or more physical constraints associated with each of the one or more objects based at least in part on the one or more characteristics of each of the one or more objects. For example, the one or more characteristics of an object (e.g., an automobile) can include physical dimensions (e.g., a length indicating that the object is ten meters long, two meters wide, and one and a half meters tall) and a velocity of one hundred kilometers per hour that correspond to one or more physical constraints of the object including a maximum turning angle (e.g., a maximum turning angle associated with safe operation of a vehicle) of four degrees from the current path of travel of the object The one or more physical constraints can include at least one of a turning radius, a minimum stopping distance, a maximum acceleration, a maximum velocity, a maximum turn angle for each velocity of a plurality of velocities, a maximum jerk threshold, and/or a maximum velocity for each angle of a plurality of turn angles. The maximum jerk threshold can be associated with a threshold amount of change in the direction of an object in a predetermined time interval. For example, the maximum jerk threshold can be a twenty degree change in the direction of an object in four-tenths of a second. An object that changed direction by more than twenty degrees in four-tenths of a second or less can be determined to have exceeded the jerk threshold.

Further, in some embodiments, the one or more physical constraints can include one or more physical constraints associated with complex movements which can include series and/or sequences of movements. For example, the one or more physical constraints can include constraints associated with the number of turns a vehicle can make in a predetermined time period, the sharpness of a turn, and/or constraints on a vehicle's ability to weave, zig-zag, or make other sequences of motions.

By way of further example, the turning radius for a large object (e.g., a city bus) can be fifteen meters and the turning radius for a smaller object (e.g., a bicycle) can be less than two meters. As such, in some embodiments a smaller object can execute sharper turns than a larger object when travelling at the same velocity and when every other physical characteristic of the smaller object, the larger object, and their environment are equal.

At 806, the method 800 can include determining, based at least in part on a machine-learned tracking and kinematics model and the one or more trajectories of the one or more objects at the one or more subsequent time intervals, one or more predicted control inputs of the one or more objects at the one or more subsequent time intervals. The one or more predicted control inputs can include a combination of predicted control inputs including inputs that change the acceleration, velocity, and/or trajectory of any of the one or more objects. For example, the vehicle computing system 112 can use a trajectory of an object at an initial time interval to determine the angle of a predicted control input that would result in the associated trajectory at a subsequent time interval. By way of further example, the vehicle computing system 112 can use the velocity of an object at an initial time interval to determine the magnitude of a predicted control input that would result in the associated velocity at a subsequent time interval.

Further, the one or more predicted control inputs of the one or more objects can include one or more inputs to one or more control devices of an object (e.g., a control device of a vehicle). For example, the one or more predicted control inputs can include a prediction that a vehicle's steering wheel will turn ten degrees to the right at a subsequent time interval half a second in the future.

Figure 9:
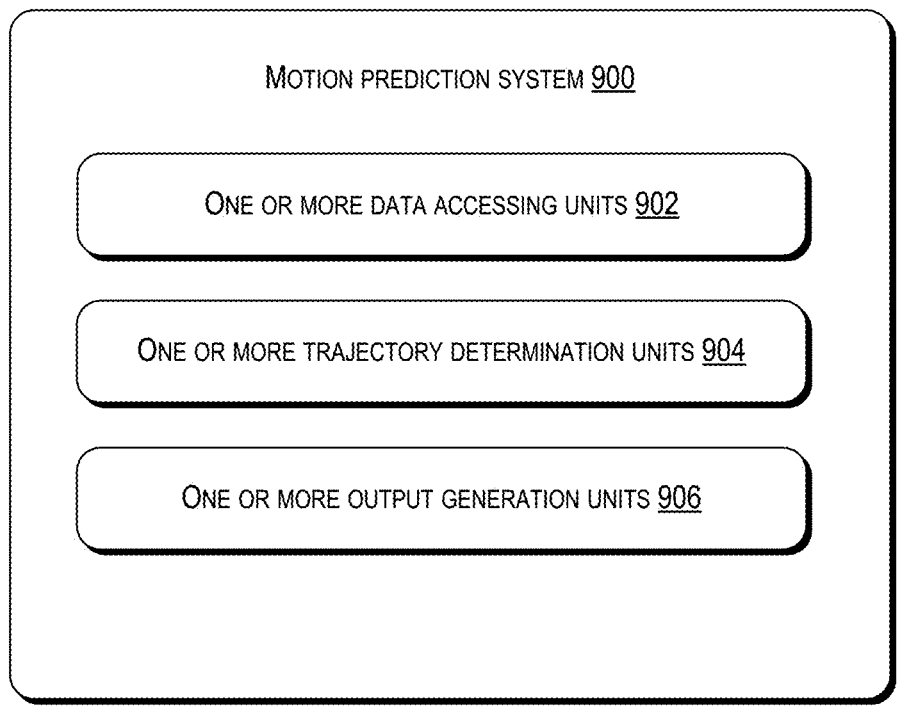
FIG. 9 depicts an example system including units for performance of operations and functions according to example embodiments of the present disclosure.

FIG. 9 depicts an example of a motion prediction system according to example embodiments of the present disclosure. One or more operations and/or functions in FIG. 9 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 9 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a motion prediction system 900 can include one or more data accessing units 902, one or more trajectory determination units 904, one or more output generation units 906, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a motion prediction system) or configured (e.g., an ASIC custom designed and configured to operate a motion prediction system) to perform one or more algorithms for performing the operations and functions described herein. For example, the means (e.g., the one or more data accessing units 902) can be configured to access state data including information associated with one or more states of one or more objects (e.g., the one or more objects described in the method 500 that is depicted in FIG. 5) including information associated with one or more locations and one or more characteristics of one or more objects over a plurality of time intervals. In some embodiments, the state data can include information associated with one or more respective locations and characteristics of one or more objects over a plurality of time intervals.

In some implementations, the one or more data accessing units 902 can be configured to determine one or more control uncertainties respectively associated with the one or more control inputs of each of the one or more objects at the one or more subsequent time intervals. Each of the one or more control uncertainties can be associated with a magnitude and/or degree of uncertainty for the one or more control inputs of each of the one or more objects at the one or more subsequent time intervals.

In some implementations, the one or more data accessing units 902 can be configured to determine, based at least in part on a machine-learned tracking and kinematics model (e.g., the machine-learned tracking and kinematics model described in the method 500 that is depicted in FIG. 5) and the one or more trajectories of the one or more objects at the one or more subsequent time intervals, one or more predicted control inputs of the one or more objects at the one or more subsequent time intervals. The one or more predicted control inputs of the one or more objects can include one or more inputs to one or more control devices of an object.

In some implementations, the one or more data accessing units 902 can be configured to determine, based at least in part on the one or more predicted locations of the one or more objects, a travel path for a vehicle in which the travel path does not traverse the one or more predicted locations of the one or more objects at the time interval that the one or more objects are determined to be at the one or more predicted locations. In some implementations, the one or more data accessing units 902 can be configured to control one or more vehicle systems associated with a vehicle based at least in part on the one or more predicted locations of the one or more objects. In some implementations, the one or more data accessing units 902 can be configured to generate or utilize the machine-learned tracking and kinematics model based at least in part on training data including a plurality of sensor observations of a plurality of training objects traversing a plurality of paths at a plurality of velocities or a plurality of accelerations. Each training object of the plurality of training objects can be associated with a plurality of respective object labels comprising a distance between a front wheel axle and a rear wheel axle of each training object.

The means (e.g., the one or more trajectory determination units 904) can be configured to determine one or more trajectories of one or more objects based at least in part on the state data and a machine-learned tracking and kinematics model (e.g., the machine-learned tracking and kinematics model described in the method 500 that is depicted in FIG. 5). The one or more trajectories can include one or more trajectories of the one or more objects at one or more subsequent time intervals after the plurality of time intervals. In some implementations, the one or more trajectory determination units 904 can be configured to determine one or more control inputs for each of the one or more objects based at least in part on the one or more trajectories of each object respectively. The one or more control inputs can include an input to one or more control devices of an object.

Further, the one or more control inputs can include a left turn of the one or more control devices or a right turn of the one or more control devices.

In some embodiments, the one or more trajectories of the one or more objects at the one or more subsequent time intervals can include one or more predicted locations of the one or more objects at the one or more subsequent time intervals. The one or more predicted locations of the one or more objects can be based at least in part on one or more physical constraints of the one or more objects. In some implementations, the one or more trajectory determination units 904 can be configured to determine the one or more physical constraints of each of the one or more objects based at least in part on the one or more characteristics of each of the one or more objects. In some implementations, the one or more trajectory determination units 904 can be configured to determine the one or more physical constraints of each of the one or more objects based at least in part on the one or more respective locations and characteristics of each of the one or more objects.

In some implementations, the one or more trajectory determination units 904 can be configured to determine one or more uncertainties respectively associated with each of the one or more predicted locations of the one or more objects. Each of the one or more uncertainties can include a respective range distance around each of the one or more predicted locations.

Furthermore, the means (e.g., the one or more output generation units 906) can be configured to generate one or more outputs including one or more predicted object states based at least in part on the one or more predicted locations of the one or more objects at the one or more subsequent time intervals.

Figure 10:
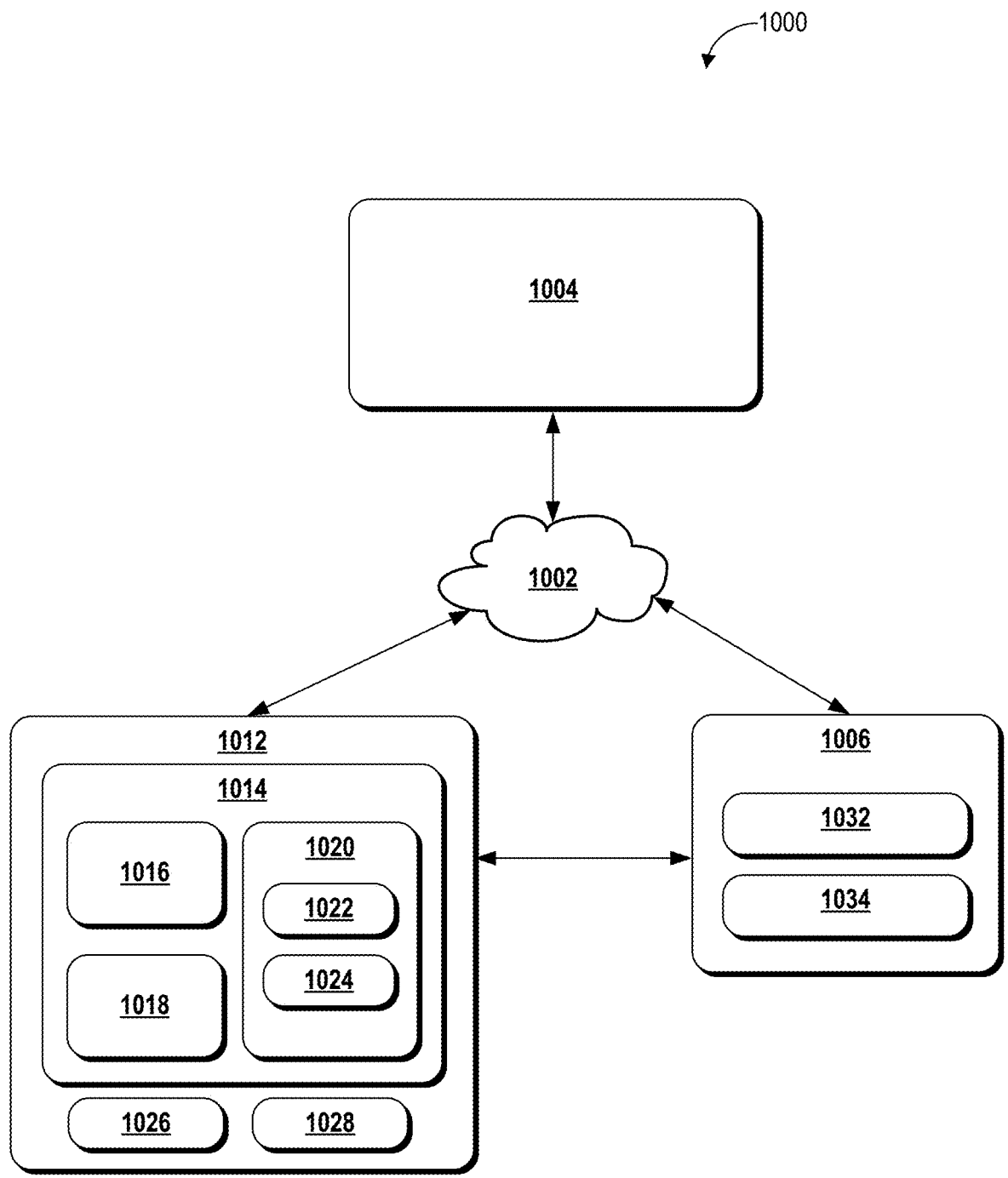
FIG. 10 depicts a diagram of an example system according to example embodiments of the present disclosure.

FIG. 10 depicts a diagram of an example system according to example embodiments of the present disclosure. A system 1000 can include a network 1002 which can include one or more features of the communications network 102 depicted in FIG. 1; an operations computing system 1004 which can include one or more features of the operations computing system 104 depicted in FIG. 1; one or more remote computing devices 1006 which can include one or more features of the one or more remote computing devices 106 depicted in FIG. 1; a vehicle computing system 1012 which can include one or more features of the vehicle computing system 112 depicted in FIG. 1; one or more computing devices 1014; a communication interface 1016; one or more processors 1018; one or more memory devices 1020; memory system 1022; memory system 1024; one or more input devices 1026; one or more output devices 1028; one or more input devices 1032; and one or more output devices 1034.

The vehicle computing system 1012 can include the one or more computing devices 1014. The one or more computing devices 1014 can include one or more processors 1018 which can be included on-board a vehicle including the vehicle 108 and one or more memory devices 1020 which can be included on-board a vehicle including the vehicle 108. The one or more processors 1018 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 1018 can include a single processor or a plurality of processors that are operatively and/or selectively connected. The one or more memory devices 1020 can include one or more non-transitory computer-readable storage media, such as RAM, ROM, EEPROM, EPROM, flash memory devices, magnetic disks, and/or combinations thereof.

The one or more memory devices 1020 can store data or information that can be accessed by the one or more processors 1018. For instance, the one or more memory devices 1020 which can be included on-board a vehicle including the vehicle 108, can include a memory system 1022 that can store computer-readable instructions that can be executed by the one or more processors 1018. The memory system 1022 can include software written in any programming language that can be implemented in hardware (e.g., computing hardware). Further, the memory system 1022 can include instructions that can be executed in logically and/or virtually separate threads on the one or more processors 1018. The memory system 1022 can include any set of instructions that when executed by the one or more processors 1018 cause the one or more processors 1018 to perform operations.

For example, the one or more memory devices 1020 which can be included on-board a vehicle (e.g., the vehicle 108) can store instructions, including specialized instructions, that when executed by the one or more processors 1018 on-board the vehicle cause the one or more processors 1018 to perform operations such as any of the operations and functions of the one or more computing devices 1014 or for which the one or more computing devices 1014 are configured, including the operations for accessing state data including information associated with one or more locations and/or one or more characteristics of one or more objects over a plurality of time intervals; determining, based at least in part on the state data and a machine-learned tracking and kinematics model (e.g., the machine-learned tracking and kinematics model described in the method 500 that is depicted in FIG. 5), one or more trajectories of the one or more objects at one or more subsequent time intervals following the plurality of time intervals, the one or more trajectories including one or more predicted locations of the one or more objects at the one or more subsequent time intervals; and generating one or more outputs including one or more predicted object states based at least in part on the one or more predicted locations of the one or more objects at the one or more subsequent time intervals; and/or any other operations and/or functions for operation of a computing system and/or vehicle, as described in the present disclosure.

The one or more memory devices 1020 can include a memory system 1024 that can store data that can be retrieved, manipulated, created, and/or stored by the one or more computing devices 1014. The data stored in memory system 1024 can include, for instance, state data (e.g., the state data described in the method 500 that is depicted in FIG. 5) associated with one or more states of one or more objects detected by one or more sensors (e.g., the one or more sensors 114 of the vehicle 108 that is described in the method 100 that is depicted in FIG. 1); data associated with one or more states of a device associated with the operations and/or functions of the vehicle computing system 1012, the operations computing system 1004, and/or the one or more remote computing devices 1006; data generated by any of the computing systems (e.g., the vehicle computing system 112) and/or computing devices involved in the determination of the one or more predicted object states (e.g., the one or more predicted object states described in the method 500 that is depicted in FIG. 5); data associated with user input; data associated with one or more actions and/or control command signals; data associated with users; and/or other data or information. Further, the data stored in the memory system 1024 can include the machine-learned tracking and kinematics models that are described herein including in the method 500 that is depicted in FIG. 5.

The data in the memory system 1024 can be stored in one or more databases. The one or more databases can be split up so that the one or more databases are located in multiple locales on-board a vehicle which can include the vehicle 108. In some implementations, the one or more computing devices 1014 can obtain data from one or more memory devices that are remote from a vehicle, including, for example the vehicle 108.

The system 1000 can include the network 1002 (e.g., a communications network) which can be used to send and/or receive signals (e.g., electronic signals) or data (e.g., data from a computing device) including signals or data exchanged between computing devices including the operations computing system 1004, the one or more remote computing devices 1006, and/or the vehicle computing system 1012. The network 1002 can include any combination of various wired (e.g., twisted pair cable) and/or wireless communication mechanisms (e.g., cellular, wireless, satellite, microwave, and radio frequency) and/or any desired network topology (or topologies). For example, the communications network 1002 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 1014 can also include the communication interface 1016 used to communicate with one or more other systems which can be included on-board a vehicle including the vehicle 108 (e.g., over the network 1002). The communication interface 1016 can include any suitable components for interfacing with one or more networks, including for example, transmitters, receivers, ports, controllers, antennas, other hardware and/or software.

The vehicle computing system 1012 can also include one or more input devices 1026 and/or one or more output devices 1028. The one or more input devices 1026 and/or the one or more output devices 1028 can be included and/or otherwise associated with a human-machine interface system. The one or more input devices 1026 can include, for example, hardware for receiving information from a user, such as a touch screen, touch pad, mouse, data entry keys, speakers, and/or a microphone suitable for voice recognition. The one or more output devices 1028 can include one or more display devices (e.g., display screen, CRT, and/or LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices and the audio output devices.

The one or more remote computing devices 1006 can include various types of computing devices. For example, the one or more remote computing devices 1006 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more remote computing devices 1006 can be associated with a user. The one or more remote computing devices 1006 described herein can also be representative of a user device that can be included in the human machine interface system of a vehicle including the vehicle 108.

The one or more remote computing devices 1006 can include one or more input devices 1032 and/or one or more output devices 1034. The one or more input devices 1032 can include, for example, hardware for receiving information from a user, such as a touch screen, touch pad, mouse, data entry keys, speakers, and/or a microphone suitable for voice recognition. The one or more output devices 1034 can include hardware for providing content for display. For example, the one or more output devices 1034 can include a display device (e.g., display screen, CRT, LCD), which can include hardware for a user interface.

Furthermore, the one or more remote computing devices 1006 can include one or more processors and one or more memory devices which can be used to store data including the state data, and/or the one or more machine-learned tracking and kinematics models that are stored in the memory system 1024.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of motion prediction, the computer-implemented method comprising:

accessing state data comprising information associated with one or more respective locations and characteristics of one or more objects over a plurality of time intervals, wherein the one or more objects comprise a two-axle vehicle;

determining one or more trajectories of the one or more objects based at least in part on the state data and a machine-learned tracking and kinematics model comprising a neural network trained by evaluation of a loss function to determine a distance between a front axle and a rear axle of the two-axle vehicle based on physical dimensions of the two-axle vehicle provided within the state data, wherein the one or more trajectories comprise one or more predicted locations of the one or more objects at one or more subsequent time intervals, and wherein the one or more predicted locations of the one or more objects are based at least in part on one or more physical constraints of the one or more objects, the one or more physical constraints comprising a turning angle of the one or more objects, wherein the turning angle of the two-axle vehicle is determined from the distance between the front axle and the rear axle of the two-axle vehicle and a velocity of the two-axle vehicle provided within the state data;

generating one or more outputs comprising one or more predicted object states based at least in part on the one or more predicted locations of the one or more objects at the one or more subsequent time intervals; and controlling one or more vehicle systems associated with an autonomous vehicle based at least in part on the one or more predicted locations of the one or more objects.

2. The computer-implemented method of claim 1, wherein:

the one or more objects comprise one or more moving objects; and the determining the one or more trajectories of the one or more objects based at least in part on the state data and the machine-learned tracking and kinematics model comprises:

determining one or more predicted control inputs for the one or more moving objects based at least in part on the one or more trajectories of the one or more moving objects, wherein the one or more predicted control inputs comprise an input to one or more control devices of a moving object of the one or more moving objects.

3. The computer-implemented method of claim 2, wherein the one or more predicted control inputs comprise a left turn of the one or more control devices or a right turn of the one or more control devices.

4. The computer-implemented method of claim 2, further comprising determining one or more control uncertainties respectively associated with the one or more predicted control inputs of the one or more objects at the one or more subsequent time intervals, wherein the one or more control uncertainties are respectively associated with a magnitude or degree of uncertainty for the one or more predicted control inputs of the one or more objects at the one or more subsequent time intervals.

5. The computer-implemented method of claim 1, wherein the determining the one or more trajectories of the one or more objects based at least in part on the state data and the machine-learned tracking and kinematics model comprises:

determining one or more uncertainties respectively associated with the one or more predicted locations of the one or more objects, wherein the one or more uncertainties comprises a respective range distance around the one or more predicted locations.

6. The computer-implemented method of claim 1, wherein the determining the one or more trajectories of the one or more objects based at least in part on the state data and the machine-learned tracking and kinematics model comprises:

determining the one or more physical constraints of the one or more objects based at least in part on the one or more respective locations and characteristics of the one or more objects.

7. The computer-implemented method of claim 6, wherein the one or more physical constraints comprise at least one of a turning radius, a minimum stopping distance, a maximum acceleration, a maximum velocity, a maximum turn angle for each velocity of a plurality of velocities, a maximum jerk threshold, or a maximum velocity for each angle of a plurality of turn angles.

8. The computer-implemented method of claim 1, wherein the state data is based at least in part on one or more outputs from one or more sensors comprising at least one of one or more light detection and ranging devices (LiDAR), one or more radar devices, one or more sonar devices, one or more thermal sensors, or one or more image sensors.

9. The computer-implemented method of claim 8, wherein the one or more sensors are positioned to provide a bird's eye view of the one or more objects.

10. The computer-implemented method of claim 8, wherein the state data comprises one or more rasterized RGB images of an environment detected by the one or more sensors.

11. The computer-implemented method of claim 1, wherein the machine-learned tracking and kinematics model comprises a convolutional neural network including one or more tracking layers and one or more kinematic layers.

12. The computer-implemented method of claim 1, wherein the one or more respective locations and characteristics comprise at least one of a plurality of physical dimensions, one or more shapes, an acceleration, a velocity, a heading, a heading rate of change, a latitude, a longitude, or an altitude.

13. The computer-implemented method of claim 12, wherein the plurality of physical dimensions comprise a distance between a front wheel axle and a rear wheel axle of an object of the one or more objects.

14. The computer-implemented method of claim 1, wherein the one or more objects comprise one or more vehicles with a fixed rear wheel axle and a moveable front wheel axle.

15. One or more tangible non-transitory computer-readable media storing computer-readable instructions that are executable by one or more processors to cause the one or more processors to perform operations, the operations comprising:
accessing state data comprising information associated with one or more respective locations and characteristics of one or more objects over a plurality of time intervals, wherein the one or more objects comprise a two-axle vehicle;
determining one or more trajectories of the one or more objects based at least in part on the state data and a machine-learned tracking and kinematics model comprising a neural network trained by evaluation of a loss function to determine a distance between a front axle and a rear axle of the two-axle vehicle based on physical dimensions of the two-axle vehicle provided within the state data, wherein the one or more trajectories comprise one or more predicted locations of the one or more objects at one or more subsequent time intervals, and wherein the one or more predicted locations of the one or more objects are based at least in part on one or more physical constraints of the one or more objects, the one or more physical constraints comprising a turning angle of the one or more objects, wherein the turning angle of the two-axle vehicle is determined from the distance between the front axle and the rear axle of the two-axle vehicle and a velocity of the two-axle vehicle provided within the state data;
generating one or more outputs comprising one or more predicted object states based at least in part on the one or more predicted locations of the one or more objects at the one or more subsequent time intervals; and
controlling one or more vehicle systems associated with an autonomous vehicle based at least in part on the one or more predicted locations of the one or more objects.

16. The one or more tangible non-transitory computer-readable media of claim 15, wherein:
the one or more objects comprise one or more moving objects; and
the operations further comprise:
determining, based at least in part on the machine-learned tracking and kinematics model and the one or more trajectories of the one or more moving objects at the one or more subsequent time intervals, one or more predicted control inputs of the one or more moving objects at the one or more subsequent time intervals, wherein the one or more predicted control inputs of the one or more moving objects comprise one or more inputs to one or more control devices of a moving object of the one or more moving objects.

17. The one or more tangible non-transitory computer-readable media of claim 15, the operations further comprising:
determining, based at least in part on the one or more predicted locations of the one or more objects, a travel path for a vehicle, wherein the travel path does not traverse the one or more predicted locations of the one or more objects at the time interval that the one or more objects are determined to be at the one or more predicted locations.

18. A computing device comprising:
one or more processors;
a memory comprising one or more computer-readable media, the memory storing computer-readable instructions that are executable by the one or more processors to cause the one or more processors to perform operations comprising:
accessing state data comprising information associated with one or more respective locations and characteristics of one or more objects over a plurality of time intervals, wherein the one or more objects comprise a two-axle vehicle;
determining one or more trajectories of the one or more objects based at least in part on the state data and a machine-learned tracking and kinematics model comprising a neural network trained by evaluation of a loss function to determine a distance between a front axle and a rear axle of the two-axle vehicle based on physical dimensions of the two-axle vehicle provided within the state data, wherein the one or more trajectories comprise one or more predicted locations of the one or more objects at one or more subsequent time intervals, and wherein the one or more predicted locations of the one or more objects are based at least in part on one or more physical constraints of the one or more objects, the one or more physical constraints comprising a turning angle of the one or more objects, wherein the turning angle of the two-axle vehicle is determined from the distance between the front axle and the rear axle of the two-axle vehicle and a velocity of the two-axle vehicle provided within the state data;

generating one or more outputs comprising one or more predicted object states based at least in part on the one or more predicted locations of the one or more objects at the one or more subsequent time intervals; and controlling one or more vehicle systems associated with an autonomous vehicle based at least in part on the one or more predicted locations of the one or more objects.

19. The computing device of claim 18, wherein the machine-learned tracking and kinematics model is based at least in part on training data comprising a plurality of sensor observations of a plurality of training objects traversing a plurality of paths at a plurality of velocities or a plurality of accelerations, and wherein each training object of the plurality of training objects is associated with a plurality of respective object labels comprising a distance between a front wheel axle and a rear wheel axle of each training object.

20. The computer-implemented method of claim 1, wherein:

the machine-learned tracking and kinematics model is trained based at least in part on training data comprising a plurality of sensor observations of a plurality of training objects respectively associated with an object label including a distance between a front axle and a rear axle of the respective training object.

* * * * *